US011518429B2

(12) United States Patent
Kurokawa et al.

(10) Patent No.: US 11,518,429 B2
(45) Date of Patent: Dec. 6, 2022

(54) TORQUE TRANSMISSION JOINT AND ELECTRIC POWER STEERING DEVICE

(71) Applicant: NSK LTD., Tokyo (JP)

(72) Inventors: Yoshifumi Kurokawa, Maebashi (JP); Toru Segawa, Maebashi (JP); Toru Ishii, Maebashi (JP)

(73) Assignee: NSK, Ltd., Tokyo (JP)

( * ) Notice: Subject to any disclaimer, the term of this patent is extended or adjusted under 35 U.S.C. 154(b) by 443 days.

(21) Appl. No.: 16/633,261

(22) PCT Filed: Jul. 23, 2018

(86) PCT No.: PCT/JP2018/027523
§ 371 (c)(1),
(2) Date: Jan. 23, 2020

(87) PCT Pub. No.: WO2019/022015
PCT Pub. Date: Jan. 31, 2019

(65) Prior Publication Data
US 2021/0129902 A1 May 6, 2021

(30) Foreign Application Priority Data
Jul. 25, 2017 (JP) .............................. JP2017-143554

(51) Int. Cl.
*B62D 5/04* (2006.01)
*F16D 3/74* (2006.01)
(Continued)

(52) U.S. Cl.
CPC ........... *B62D 5/0409* (2013.01); *F16D 3/185* (2013.01); *F16D 3/74* (2013.01); *F16D 3/68* (2013.01);
(Continued)

(58) Field of Classification Search
CPC ......... B62D 5/0409; F16D 3/185; F16D 3/74; F16D 3/68; F16D 2200/0056; F16D 2300/00; F16D 2300/20
(Continued)

(56) References Cited

U.S. PATENT DOCUMENTS 3,233,427 A * 2/1966 Firth ......................... F16D 3/74
7,658,678 B2 * 2/2010 Kneeshaw ................ F16D 3/52
(Continued)

FOREIGN PATENT DOCUMENTS

| JP | 2002518643 A | 6/2002 |
| JP | 2004306898 | 4/2004 |
| WO | 2016047188 | 3/2016 |

OTHER PUBLICATIONS

International Search Report for International Application No. PCT/JP2018/027523, dated Oct. 23, 2018, (1 page).
(Continued)

*Primary Examiner* — Greg Binda
(74) *Attorney, Agent, or Firm* — Hartman Global IP Law; Gary M. Hartman; Domenica N. S. Hartman

(57) ABSTRACT

The torque transmission joint includes an intermediate transmission member, and a first transmission member and a second transmission member that are arranged with one each on both side sections in the axial direction of the intermediate transmission member, with the outer side sections in the radial direction of each engaging with the inside section in the radial direction of the intermediate transmission member. The first transmission member and the second transmission member have a first preliminary engagement section and a second preliminary engagement section at the end sections in the axial direction on sides close to each other. The first preliminary engagement section and the second preliminary engagement section engage with each other with a circumferential gap interposed therebetween
(Continued)

that does not disappear when torque transmission is performed between the first transmission member and the second transmission member via the intermediate transmission member.

11 Claims, 30 Drawing Sheets

(51) Int. Cl.
  *F16D 3/18* (2006.01)
  *F16D 3/68* (2006.01)
(52) U.S. Cl.
  CPC .. *F16D 2200/0056* (2013.01); *F16D 2300/00* (2013.01); *F16D 2300/20* (2021.01)
(58) Field of Classification Search
  USPC .............................................. 180/444; 464/75
  See application file for complete search history.

(56) References Cited

U.S. PATENT DOCUMENTS

| | | |
|---|---|---|
| 2008/0171603 A1 | 7/2008 | Kneeshaw et al. |
| 2017/0175821 A1 | 6/2017 | Segawa et al. |
| 2018/0066713 A1 | 3/2018 | Oosawa et al. |

OTHER PUBLICATIONS

European Search Report for International Application No. PCT/JP2018/027523, dated Jan. 27, 2021, (7 pages).

\* cited by examiner

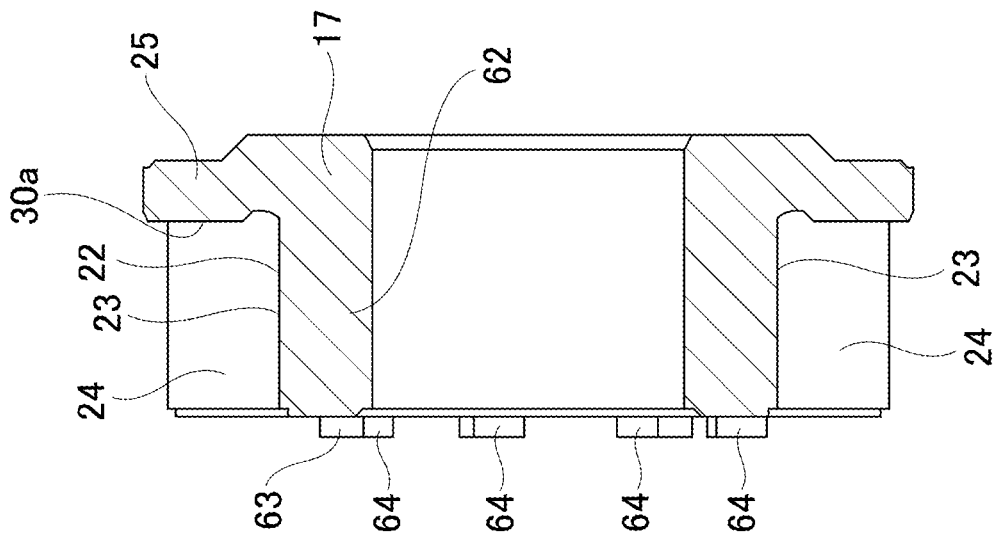
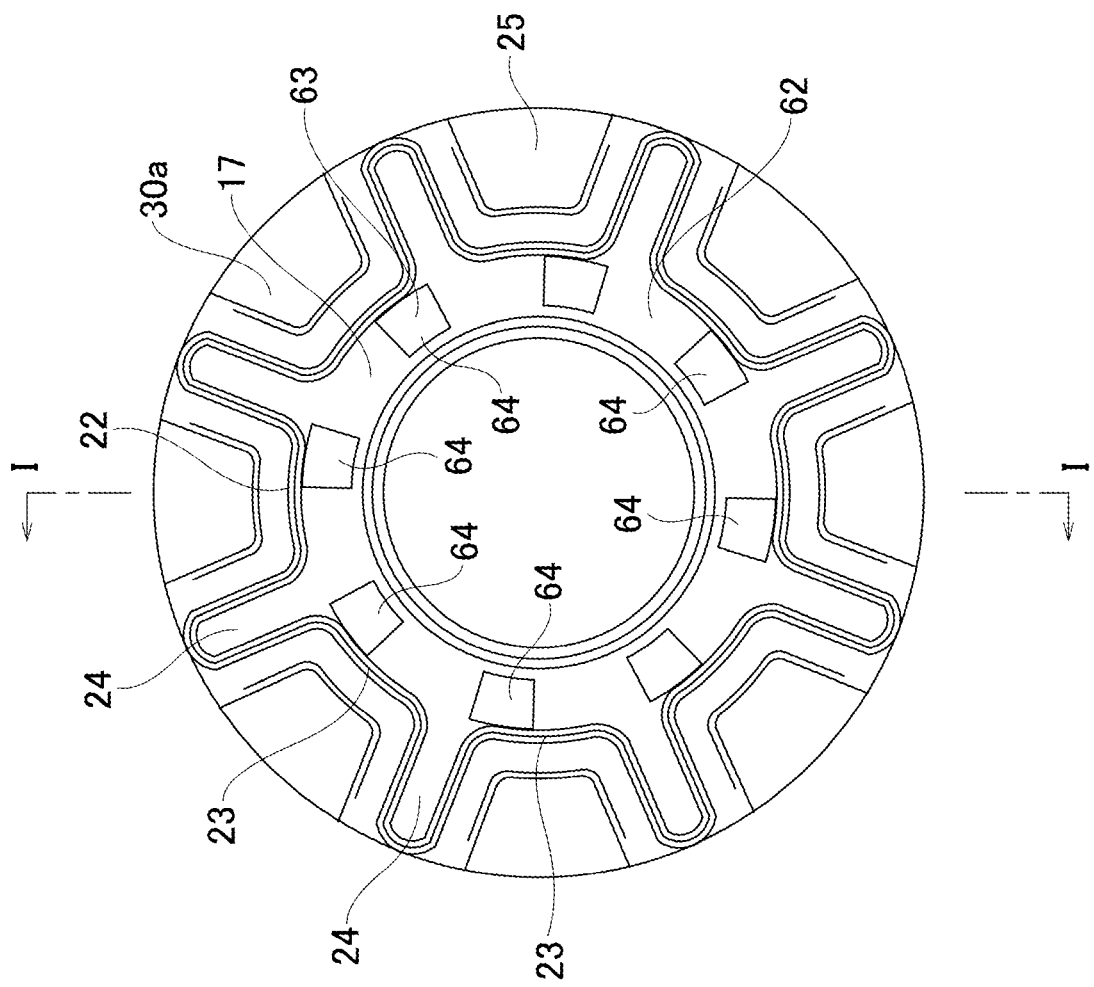

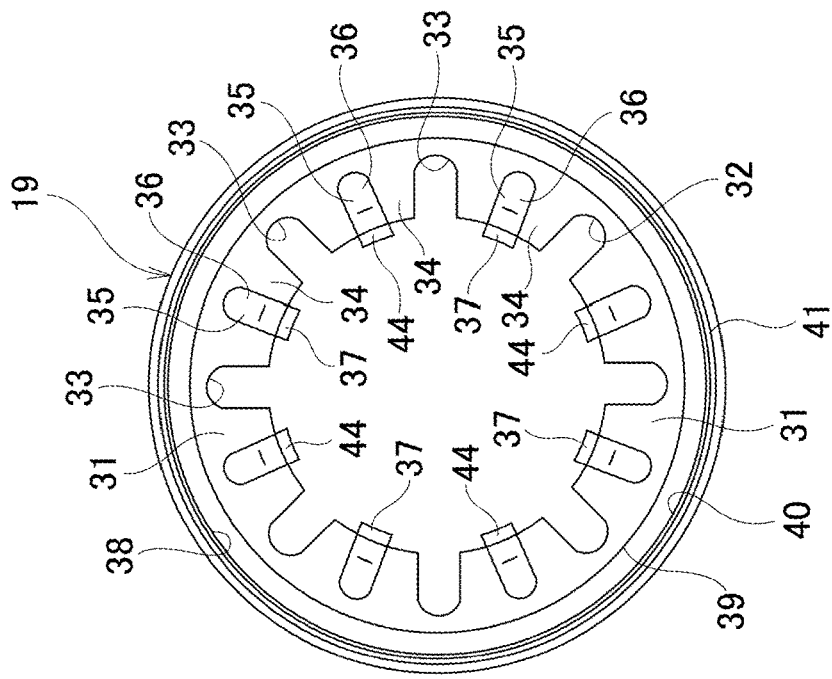
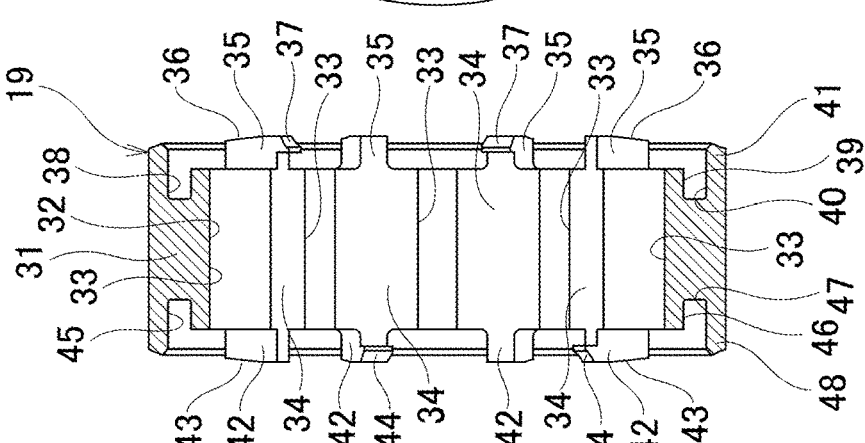
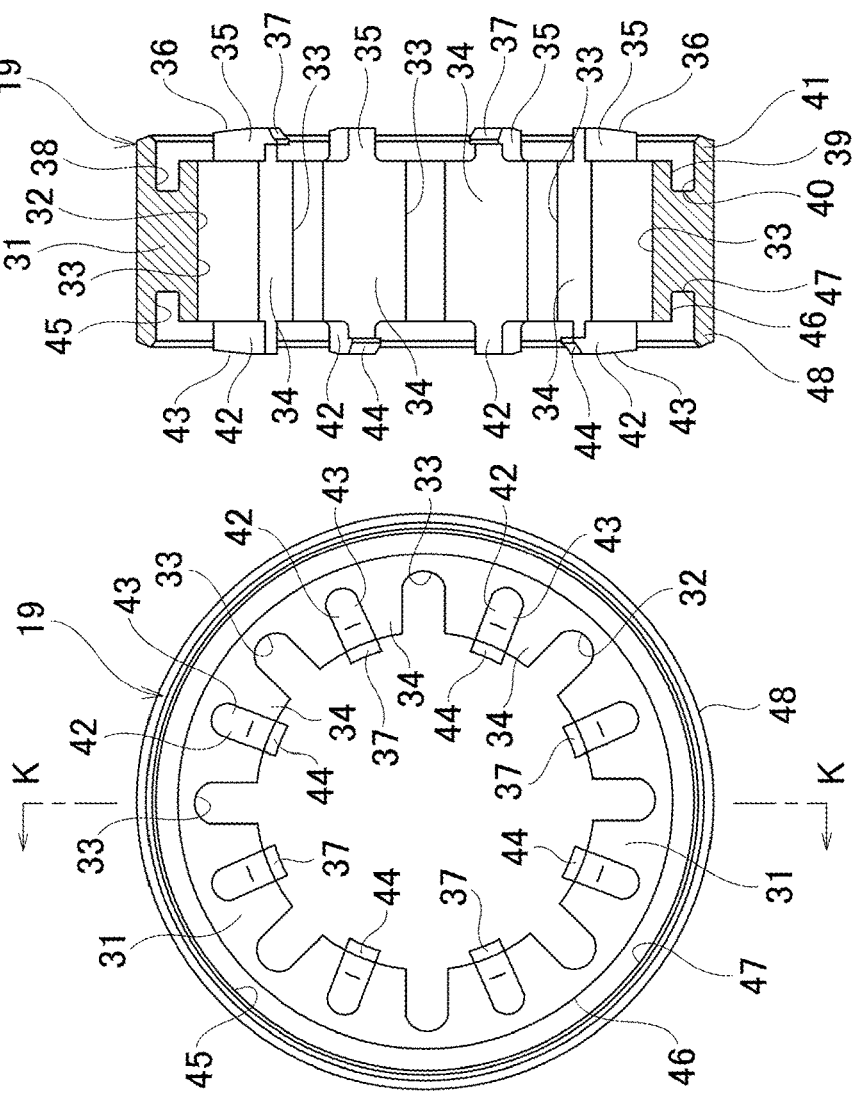

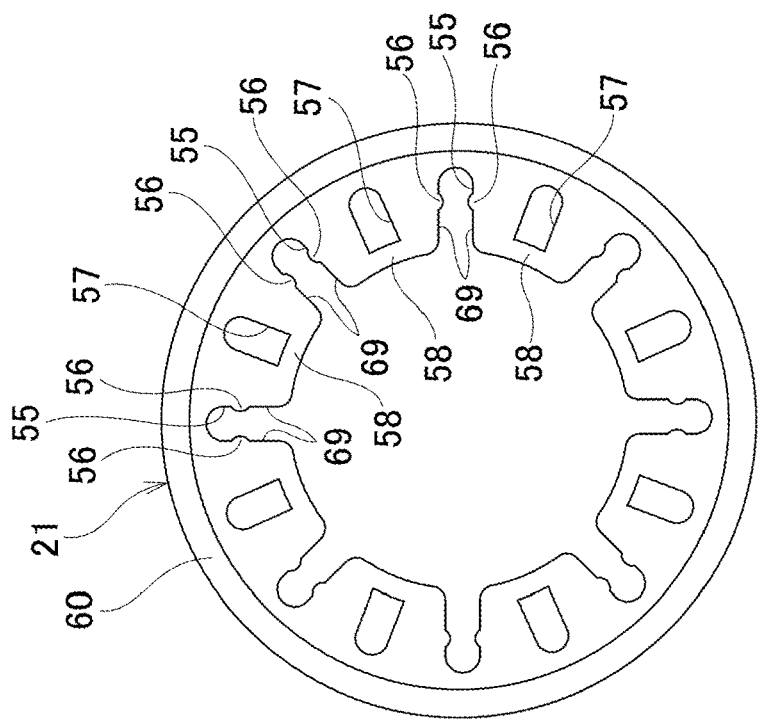
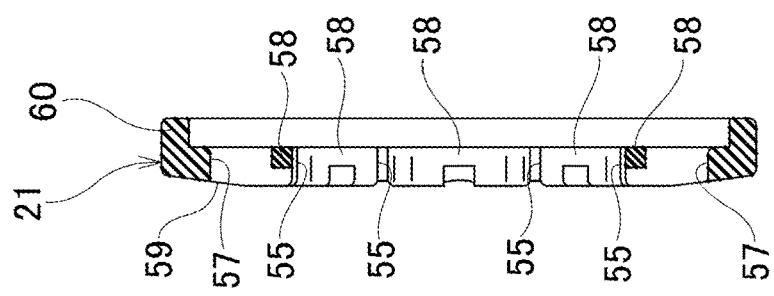
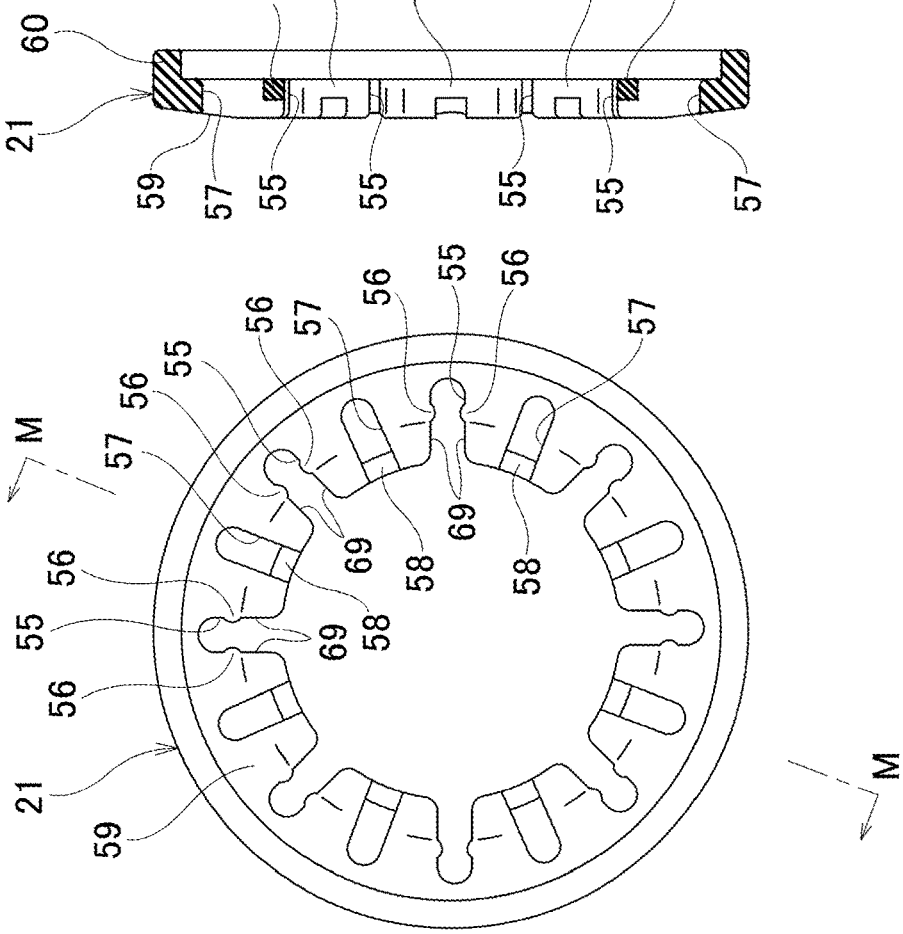

TORQUE TRANSMISSION JOINT AND ELECTRIC POWER STEERING DEVICE

CROSS REFERENCE TO RELATED APPLICATIONS

This application claims the benefit of PCT/JP2018/027523 filed Jul. 23, 2018, having a priority claim to Japanese Patent Application No. 2017-143554 filed Jul. 25, 2017. The contents of these prior patent documents are incorporated herein by reference.

TECHNICAL FIELD

The present invention relates to a torque transmission joint used for transmitting torque between a drive shaft and a driven shaft in various mechanical devices, and an electric power steering device incorporating the torque transmission joint.

BACKGROUND ART

FIG. 29 and FIG. 30 illustrate an example of a publicly known electric power steering device described in JP 2004-306898A and the like. A steering wheel 1 is attached to a rear-end portion of a steering shaft 2, and a front-end portion of the steering shaft 2 is rotatably supported in a housing 3. A worm wheel 4 is fixed to a portion that is rotationally driven by the steering shaft 2 inside the housing 3. A worm shaft 6, a worm 5 that is provided at an intermediate portion in the axial direction of the worm shaft 6 and having worm teeth 7 that engage with the worm wheel 4, and an electric motor 8 for rotationally driving the worm 5, are provided inside the housing 3. Both end sections in the axial direction of the worm 5 are rotatably supported in the housing 3 by a pair of rolling bearings 9a and 9b such as deep groove ball bearings or the like.

A pressing piece 10 is externally fitted to a portion protruding from the rolling bearing 9a at the tip-end section of the worm shaft 6. An elastic member such as a coil spring 11 or the like is provided between the pressing piece 10 and the housing 3. The coil spring 11 forces the worm teeth 7 of the worm shaft 6 toward the worm wheel 4 via the pressing piece 10. With such a configuration, backlash between the worm teeth 7 and the worm wheel 4 is suppressed, and generation of rattling noise is suppressed.

A spline hole 13 is provided at the base end section of the worm shaft 6. A spline shaft section 14 is provided on the tip-end section of the output shaft 12 of the electric motor 8. With the spline hole 13 of the worm shaft 6 and the spline shaft section 14 of the electric motor 8 engaged by a spline engagement, the output shaft 12 of the electric motor 8 and the worm shaft 6 are coupled so as to transmit torque.

In a structure that suppresses backlash between the worm teeth 7 and the worm wheel 4, it is necessary to allow pivotal displacement of the worm shaft 6 with respect to the output shaft 12. Therefore, a structure making it possible to increase a misalignment tolerance (inclination, off-center or the like) between the tip-end section of the output shaft 12 and the base end section of the worm shaft 6 is required for the joint section between the tip-end section of the output shaft 12 and the base end section of the worm shaft 6 is required.

As such a structure, JP 2002-518643A describes a structure of a joint section that includes a pair of end section transmission members composed of one end section transmission member that is mounted in one shaft, and the other end section transmission member that is mounted in another shaft, and wherein the outer circumferential surface of the one end section transmission member and the outer circumferential surface of the other end section transmission member engage with each other by a concave-convex engagement in the circumferential direction with respect to the inner circumferential surfaces on both side sections in the axial direction of a sleeve-shaped intermediate transmission member. In the structure of this joint section, the sum of the misalignment tolerance between the one end section transmission member and the intermediate transmission member and the misalignment tolerance between the other end section transmission member and the intermediate transmission member is the misalignment tolerance between the pair of end section transmission members, so the misalignment tolerance between the pair of end section transmission members may be increased.

PRIOR ART DOCUMENTS

Patent Literature

Patent Literature 1: JP 2004-306898A
Patent Literature 2: JP 2002-518643A

SUMMARY OF INVENTION

Problem to be Solved by the Invention

In a conventional structure described in JP 2002-518643A, in a case where the torque transmission function of an intermediate transmission member is deteriorated, there is a problem in that the torque transmission between a pair of end section transmission members is not sufficiently continued.

An object of the present invention is to provide a torque transmission joint capable of continuously performing torque transmission between a pair of end section transmission members even in a case where the torque transmission function of an intermediate transmission member is deteriorated.

Means for Solving the Problems

The torque transmission joint of the present invention includes an intermediate transmission member, and a pair of end section transmission members.

The intermediate transmission member has an intermediate concave-convex section in which concave sections and convex sections are alternately arranged on the circumferential surface on one side in the radial direction.

The pair of end section transmission members is arranged in the axial direction on the one side in the radial direction of the intermediate transmission member. More specifically, the pair of end section transmission members is arranged with one each in sections on both sides in the axial direction of the intermediate transmission member. Each of the pair of end section transmission members includes an end section side concave-convex section in which concave sections and convex sections are alternately arranged on a circumferential surface on the other side in the radial direction, and a preliminary engagement section provided at an end section in the axial direction on a side where the pair of end section transmission members is close to each other. In case that the one side in the radial direction is the inner side in the radial direction, the other side in the radial direction is the outer side in the radial direction, and in this case, the pair of end section transmission members is arranged on the inner side in the radial direction of the intermediate transmission member, the intermediate concave-convex section is provided on the inner circumferential surface of the intermediate transmission member, and the end section side concave-convex section is provided on the outer circumferential surface of each of the pair of end section transmission members. On the other hand, in case that the one side in the radial direction is the outer side in the radial direction, the other side in the radial direction is the inner side in the radial direction. In this case, the pair of end section transmission members is arranged on the outer side in the radial direction of the intermediate transmission member, the intermediate concave-convex section is provided on the outer circumferential surface of the intermediate transmission member, and the end section side concave-convex section is provided on the inner circumferential surface of each of the pair of end section transmission members.

In a state where the end section side concave-convex sections of the pair of end section transmission members are separated from each other in the axial direction, the convex sections of the end section side concave-convex sections engage with the concave sections of the intermediate concave-convex section. In other words, the end section side concave-convex sections of the pair of end section transmission members do not overlap each other in the circumferential direction.

The preliminary engagement sections of the pair of end section transmission members engage with each other in a state with circumferential gaps interposed therebetween.

Preferably the circumferential gaps are configured not to disappear even when torque transmission is performed between the pair of end section transmission section members via the intermediate transmission member With this kind of configuration, when torque transmission is performed between the pair of end section transmission members via the intermediate transmission member in a state in which the torque transmission function of the intermediate transmission member is not deteriorated, the preliminary engagement sections of the pair of end section transmission members engage with each other in a state with circumferential gaps interposed therebetween. In other words, the preliminary engagement sections do not engage with each other to enable torque transmission. On the other hand, when torque transmission is performed between the pair of end section transmission members in a state in which the torque transmission function of the intermediate transmission member is deteriorated, the preliminary engagement sections of the pair of end section transmission members engage with each other without circumferential gaps being interposed therebetween, or engage with each other via the convex sections of the intermediate concave-convex section of the intermediate transmission member without circumferential gaps being interposed therebetween. In other words, the preliminary engagement sections engage with each other so as to enable torque transmission.

The torque transmission joint of the present invention may further include a pair of elastic members assembled in sections on both sides in the axial direction of the intermediate transmission member. In this case, the convex sections of the end section side concave-convex sections of the pair of end section transmission members engage with the pair of elastic members, and engage with the concave sections of the intermediate concave-convex section with circumferential gaps interposed therebetween. The circumferential gaps between the preliminary engagement sections of the pair of end section transmission members are configured to be larger than the circumferential gaps between the concave sections of the intermediate concave-convex section and the convex sections of the end section side concave-convex sections of the pair of end section transmission members.

Each of the preliminary engagement sections of the pair of end section transmission members may be configured by at least one preliminary piece. Preferably, each of the preliminary engagement sections of the pair of end section transmission members is configured by a plurality of preliminary pieces arranged at an equal pitch in the circumferential direction. In this case, the preliminary pieces of one end section transmission member of the pair of end section transmission members and the preliminary pieces of the other end section transmission member of the pair of end section transmission members are alternately arranged one by one in the circumferential direction. Alternatively, the preliminary engagement section of one end section transmission member of the preliminary engagement sections of the pair of end section transmission members may be configured by at least one preliminary piece, and the preliminary engagement section of the other end section transmission member may be configured by at least one preliminary concave section.

Between the pair of end section transmission members, the plurality of preliminary pieces and the end section side concave-convex sections are configured to have the same shape and the same size. In this case, the number of the plurality of preliminary pieces is the same as the number of the concave sections of the end section side concave-convex sections. Each of the plurality of preliminary pieces is arranged inside a range in the circumferential direction sandwiched between the respective central positions in the circumferential direction of the concave sections and the convex sections that are adjacent to each other in the circumferential direction of the concave sections and the convex sections of the end section side concave-convex sections. In this case, preferably, each of the plurality of preliminary pieces is arranged inside a range in the circumferential direction sandwiched between a straight line passing through the central position in the circumferential direction of one convex section of the convex sections of the end section side concave-convex sections and the center axis of the torque transmission joint and a straight line passing through the central position in the circumferential direction between the one convex section and another convex section adjacent to the one convex section and the center axis of the torque transmission joint.

The electric power steering device of the present invention includes:

a housing;

a worm wheel rotatably supported by the housing;

a worm having a worm shaft, and worm teeth provided on an outer circumferential surface of the worm shaft and engaging with the worm wheel, the worm rotatably supported with respect to the housing;

an electric motor comprising an output shaft for rotationally driving the worm; and a torque transmission joint for connecting the output shaft of the electric motor and the worm shaft to enable torque transmission.

Particularly, in the electric power steering device of the present invention, the torque transmission joint is constructed by the torque transmission joint according to the present invention; one end section transmission member of the pair of end section transmission members is fixed to or integrally formed with a tip-end section of the output shaft of the electric motor; and the other end section transmission member of the pair of end section transmission members is fixed to or integrally formed with a base end section of the worm shaft.

In the electric power steering device of the present invention, it is possible to adopt a configuration in which the worm is able to pivot with respect to the output shaft of the electric motor, and a force mechanism that forces the worm toward the worm wheel is provided between the tip-end section of the worm shaft and the housing.

Effect of Invention

With the torque transmission joint and the electric power steering device of the present invention, torque transmission may be continuously performed between a pair of end section transmission members even when the torque transmission function of an intermediate transmission member is deteriorated.

BRIEF DESCRIPTION OF DRAWINGS

FIG. 14A is a diagram illustrating a first transmission member of the torque transmission joint according to the first example as seen from the left side in FIG. 5. FIG. 14B is a cross-sectional view of section I-I in FIG. 14A.

FIG. 16A is a view illustrating the intermediate transmission member according to the first example as seen from the left side in FIG. 5. FIG. 16B is a cross-sectional view of section K-K in FIG. 16A. FIG. 16C is a view illustrating the intermediate transmission member as seen from the right side in FIG. 5.

FIG. 18A is a view illustrating the second elastic member according to the first example as seen from the left side in FIG. 5. FIG. 18B is a cross-sectional view of section M-M in FIG. 18A. FIG. 18C is a view illustrating the second elastic member as seen from the right side in FIG. 5.

MODES FOR CARRYING OUT THE INVENTION

First Example

Figure 1:
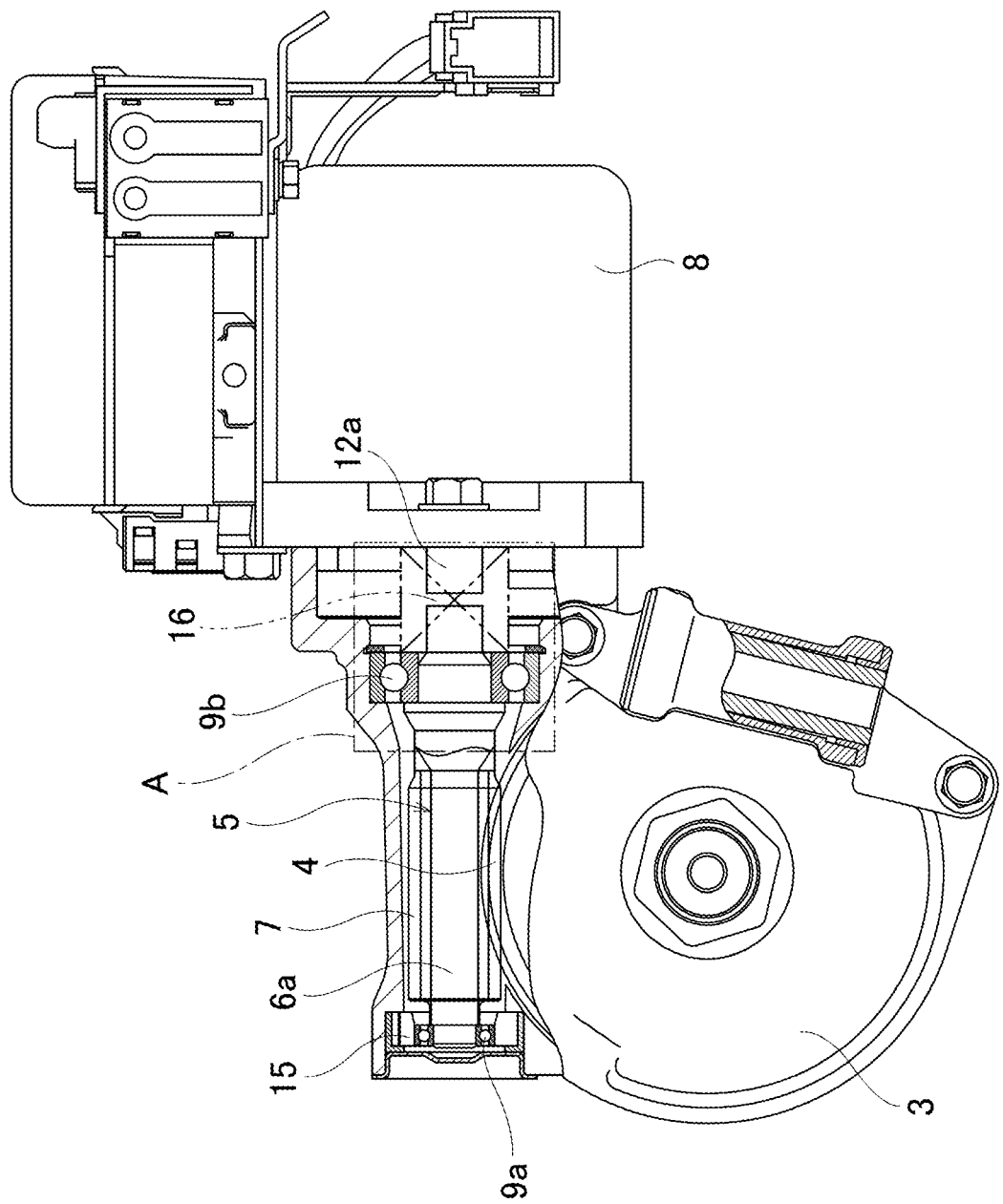
FIG. 1 is a cross-sectional view of a joint section between an electric motor and a worm shaft of an electric power steering device to which a torque transmission joint according to a first example of an embodiment of the present invention is applied.
Figure 2:
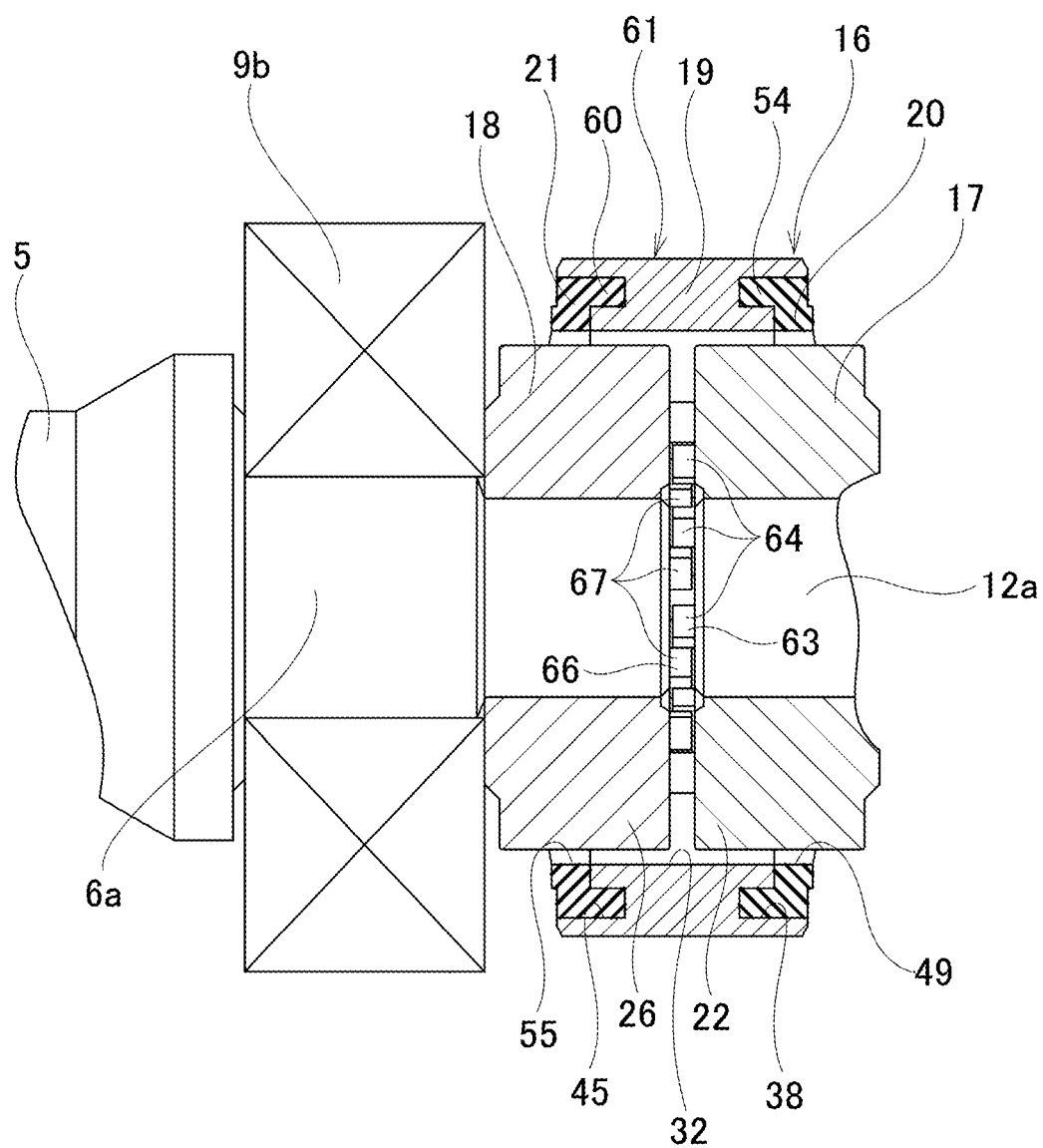
FIG. 2 is an enlarged view of part A of FIG. 1 with some parts omitted.
Figure 3:
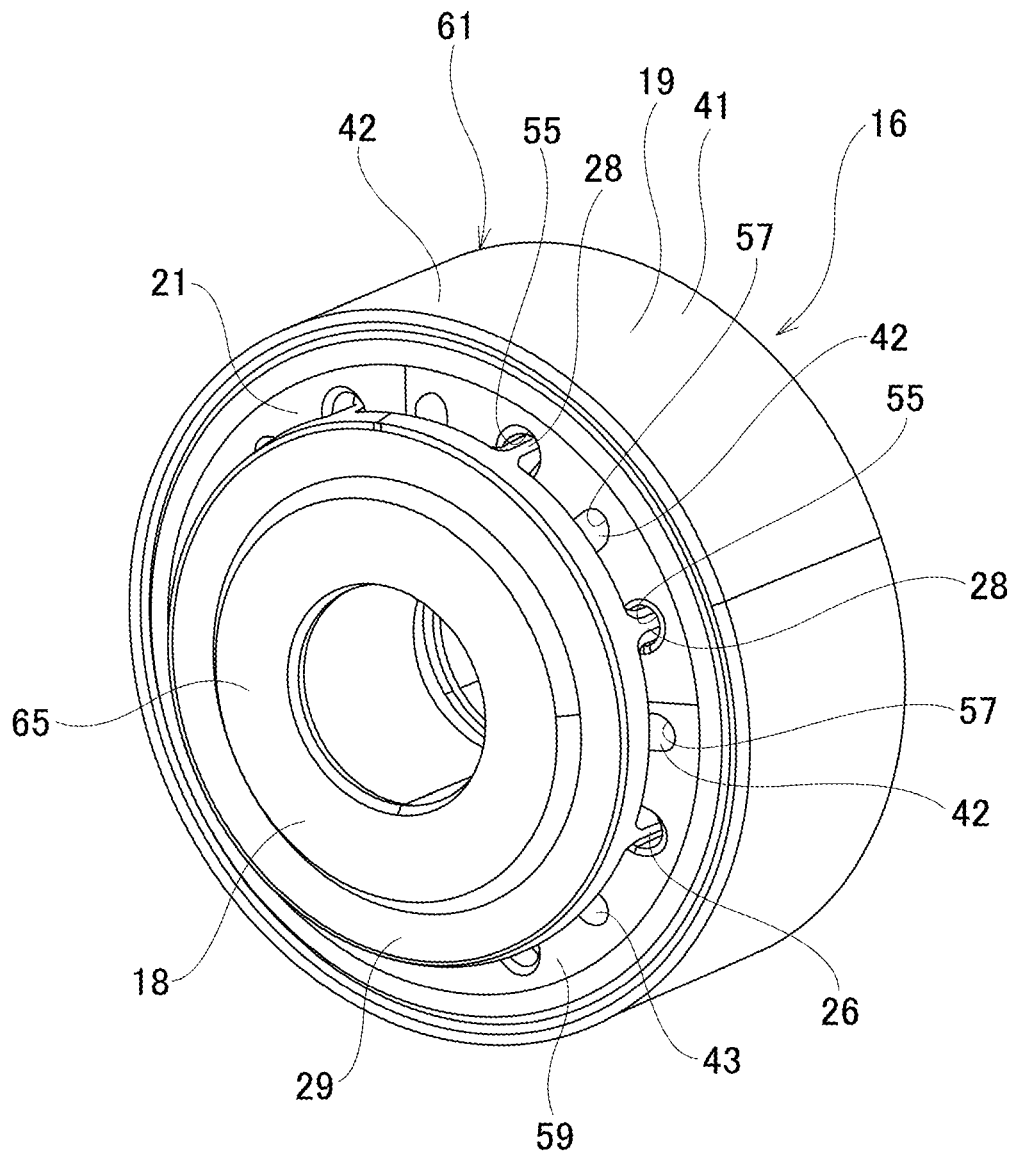
FIG. 3 is a perspective view of the torque transmission joint according to the first example.
Figure 4:
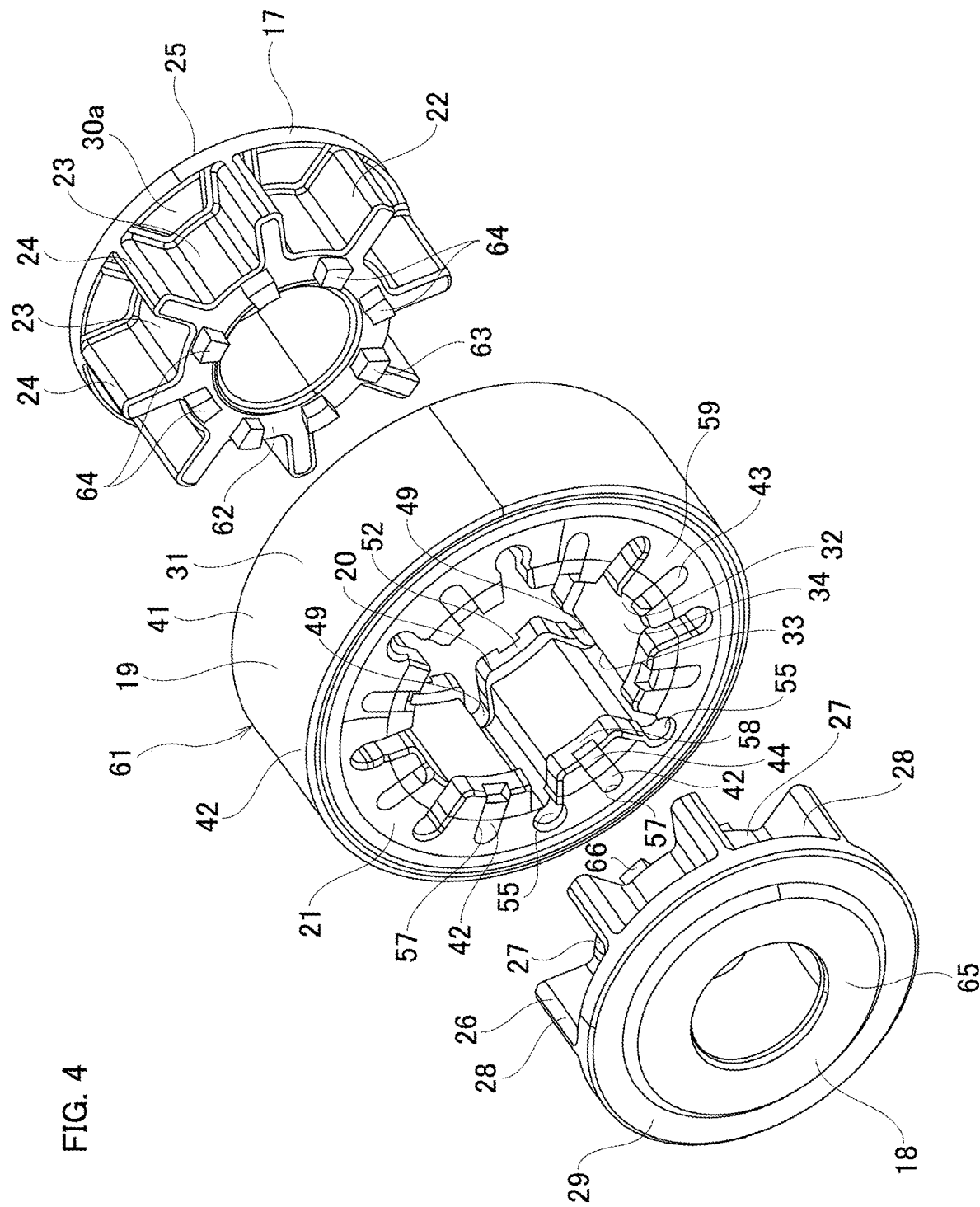
FIG. 4 is a partially exploded perspective view illustrating the torque transmission joint according to the first example.

A first example of an embodiment of the present invention will be described with reference to FIGS. 1 to 18.

The electric power steering device of this example includes: a housing 3; a worm wheel 4 that is rotatably supported by the housing 3; a worm 5 provided with a worm shaft 6a and worm teeth 7 that are provided on the outer circumferential surface of the worm shaft 6a and that engage with the worm wheel 4, the worm 4 rotatably supported with respect to the housing 3; an electric motor 8 having an output shaft 12a for rotationally driving the worm 5; and a torque transmission joint 16 that connects the output shaft 12a of the electric motor 8 and the worm shaft 6a so as to enable torque transmission.

Figure 29:
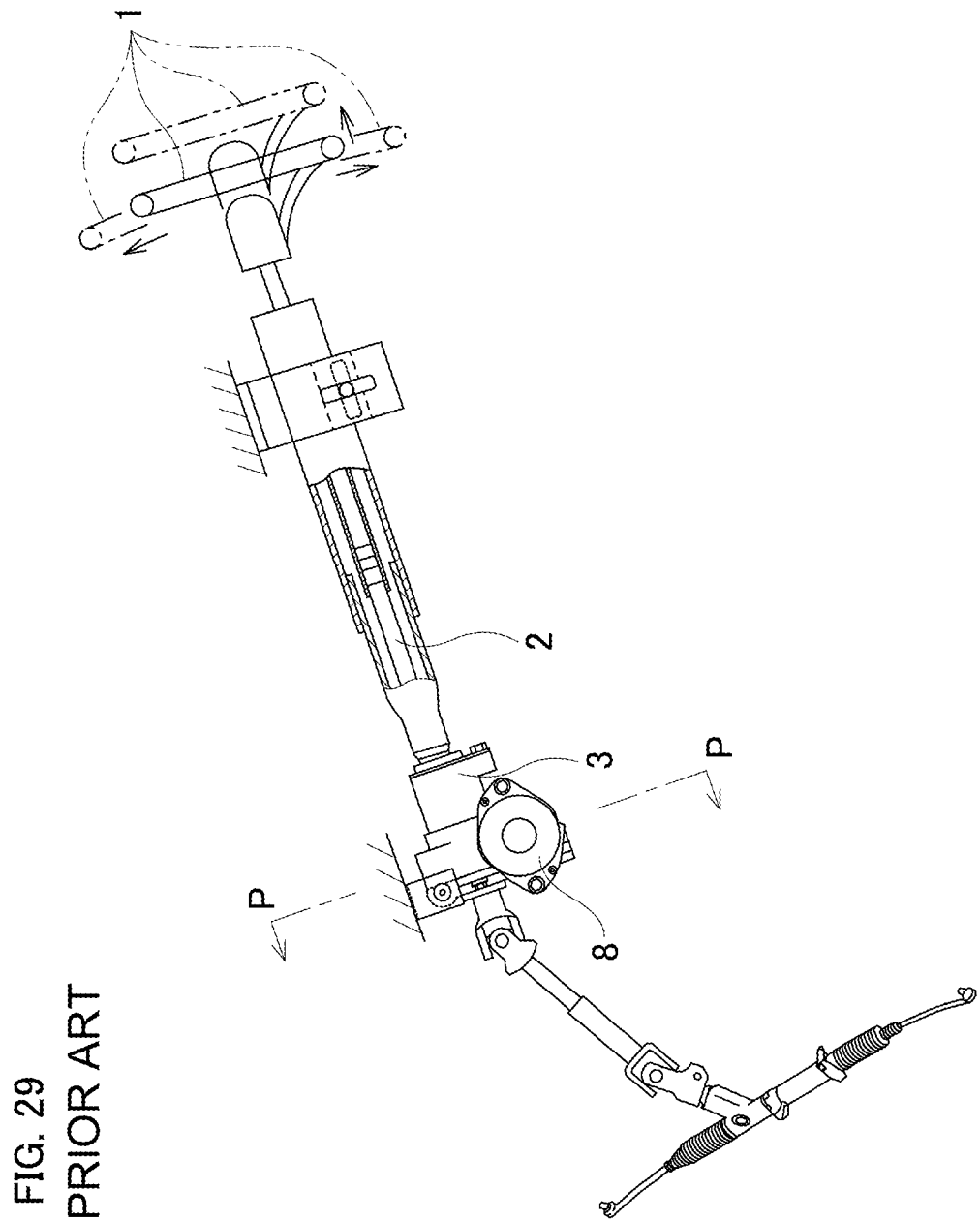
FIG. 29 is a partial cross-sectional side view illustrating an example of a conventional structure of an electric power steering device.
Figure 30:
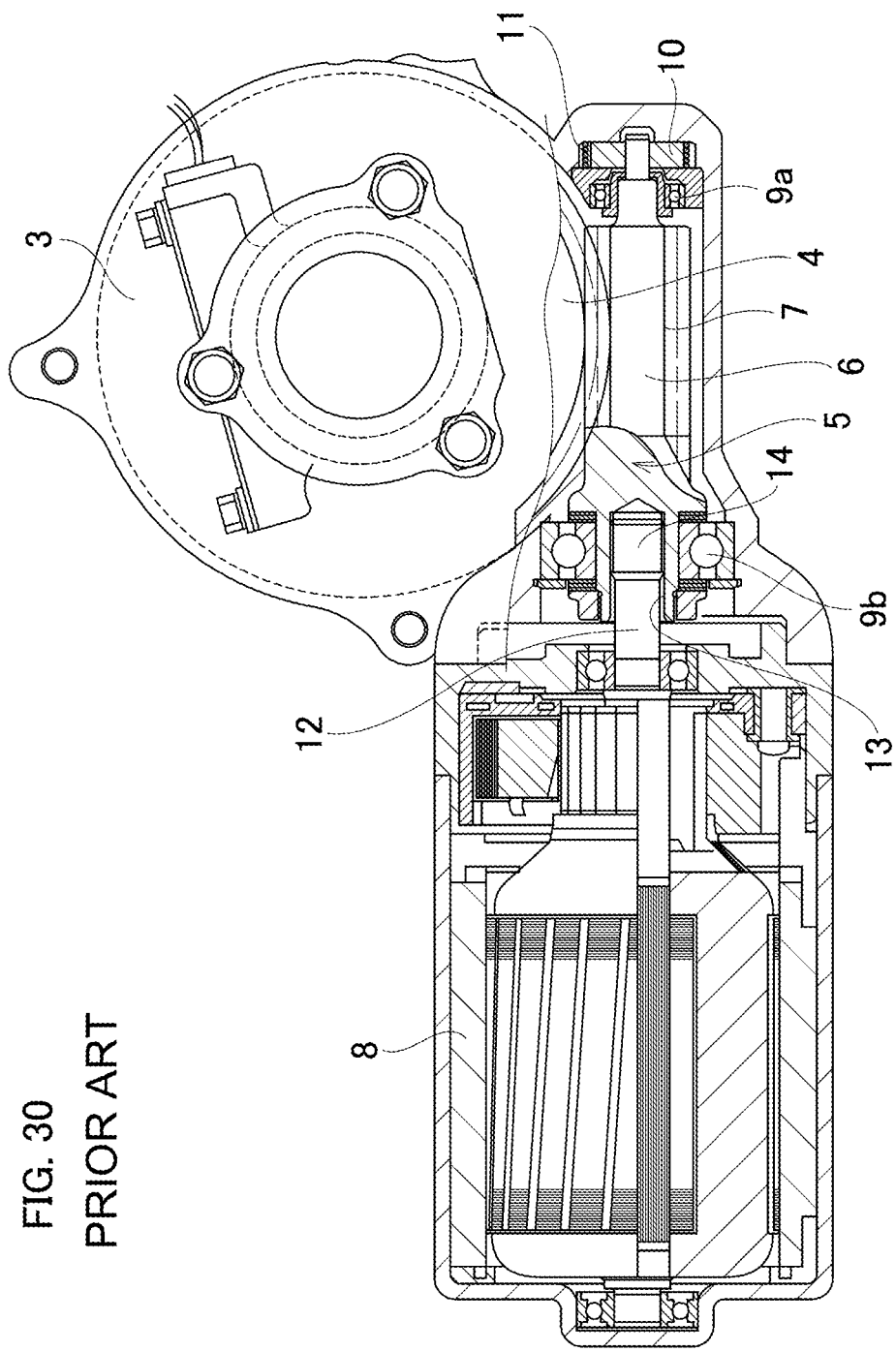
FIG. 30 is an enlarged cross-sectional view of section P-P in FIG. 29.

Although not limited to the following structure, as in the conventional structure illustrated in FIG. 29 and FIG. 30, the front-end section of a steering shaft 2 is rotatably supported inside the housing 3, and the worm wheel 4 is fixed to a portion that is rotationally driven by the steering shaft 2. Both end sections in the axial direction of the worm 5 are rotatably supported inside the housing 3 by a pair of rolling bearings 9a, 9b such as deep groove ball bearings or the like. A force mechanism 15 that is configured to include an elastic body such as a coil spring, a leaf spring or the like is provided between the rolling bearing 9a that is fitted onto the tip-end section of the worm shaft 6a and the housing 3. The force mechanism 15 presses, or in other words, forces the worm teeth 7 of the worm shaft 6a toward the worm wheel 4 based on the elasticity of the elastic body. With this kind of a configuration, backlash between the worm teeth 7 and the worm wheel 4 is suppressed, and the occurrence of rattling noise is suppressed.

In this example, the tip-end section of the output shaft 12a of the electric motor 8, which is a drive shaft, and the base end section of the worm shaft 6a, which is a driven shaft, are arranged in series with each other in the axial direction and are coupled via the torque transmission joint 16 so as to enable torque transmission.

Note that in this description, with regard to the torque transmission joint 16, the drive shaft side (the night side in FIG. 2 to FIG. 6, FIG. 8, FIG. 9, and FIG. 13) is defined as one side in the axial direction, and the driven shaft side (left side in FIG. 2 to FIG. 6, FIG. 8, FIG. 9, and FIG. 13) is defined as the other side in the axial direction.

Figure 5:
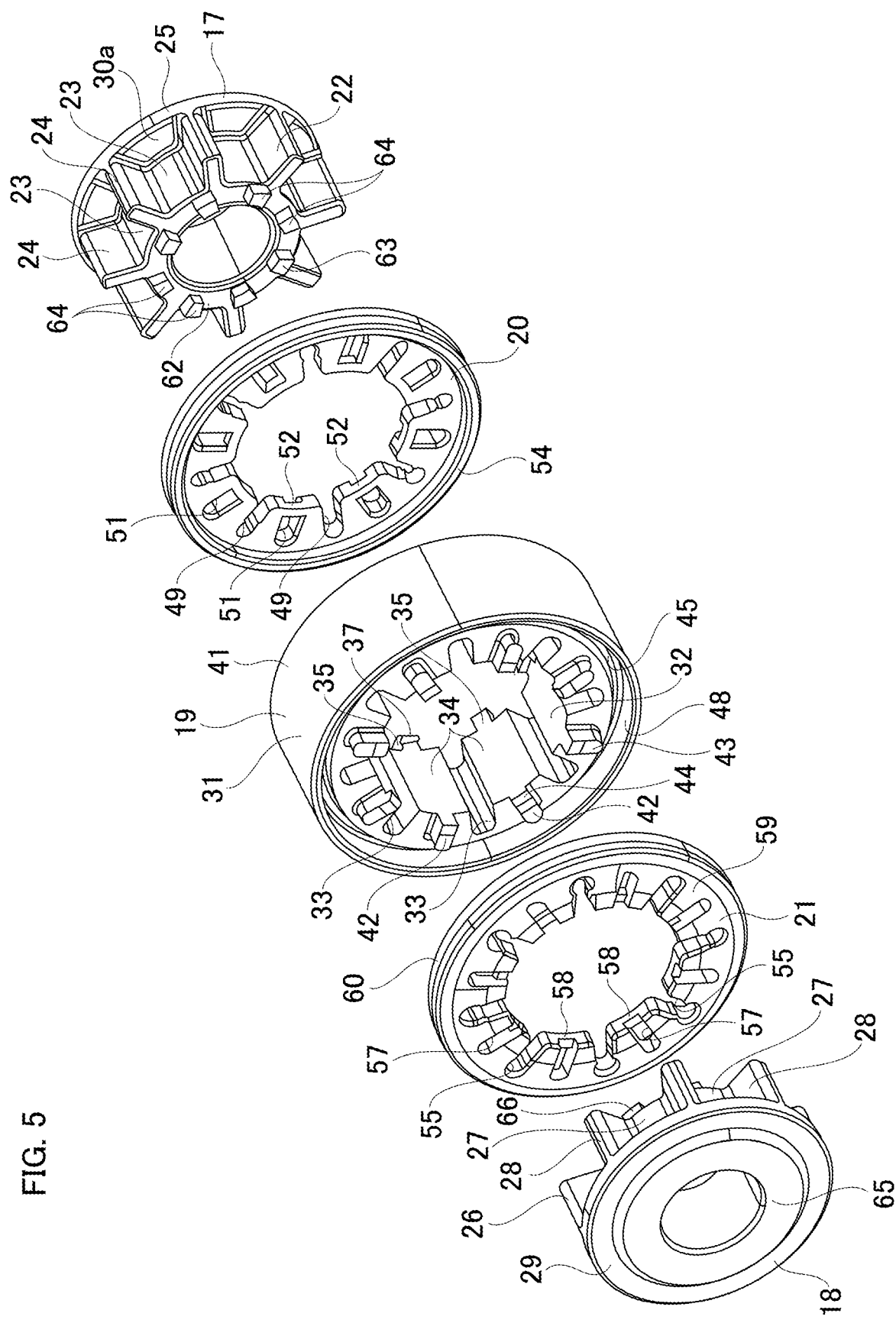
FIG. 5 is an exploded perspective view illustrating the entire torque transmission joint according to the first example.
Figure 6:
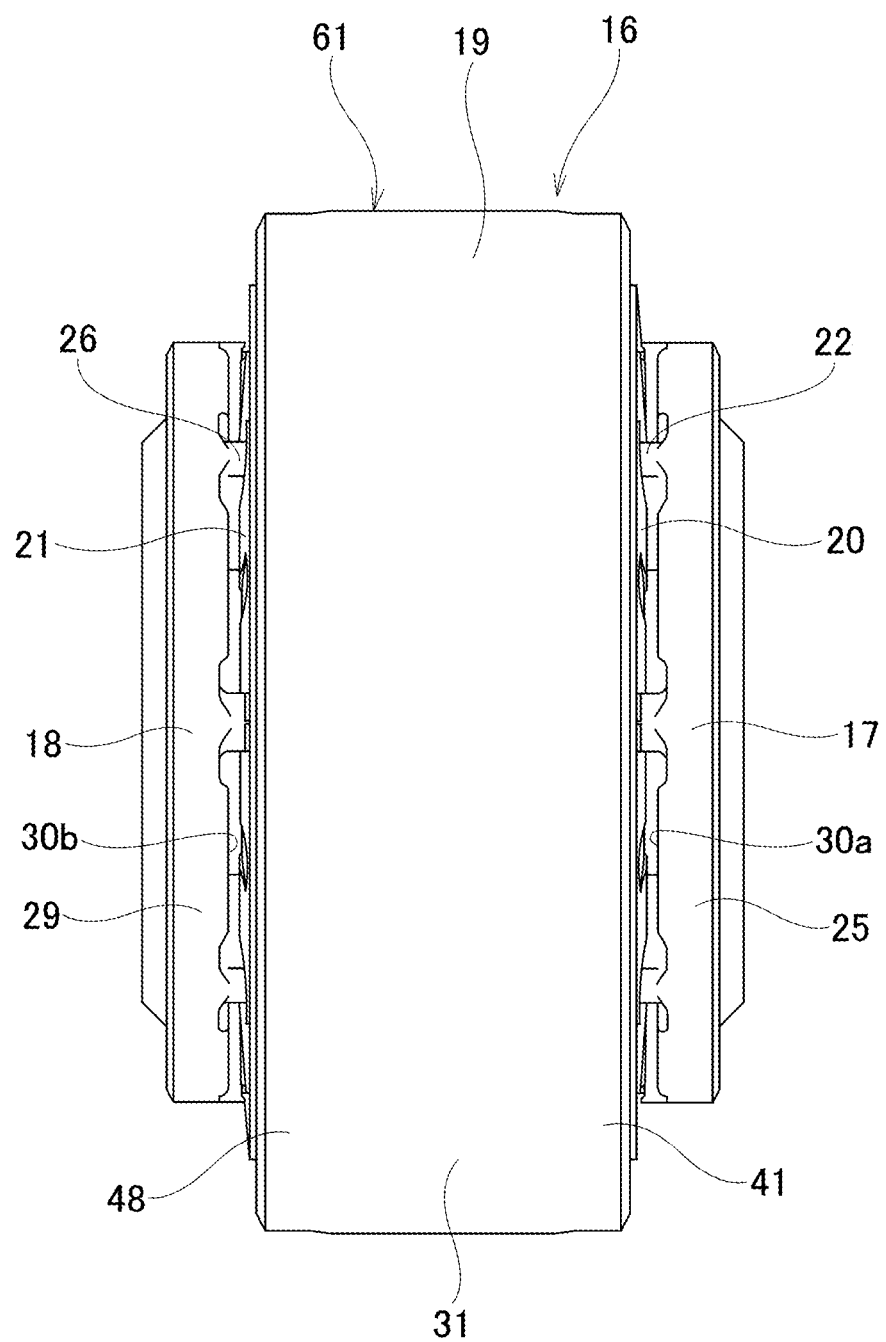
FIG. 6 is a view of the torque transmission joint according to the first example as viewed from the outer side in the radial direction.
Figure 7:
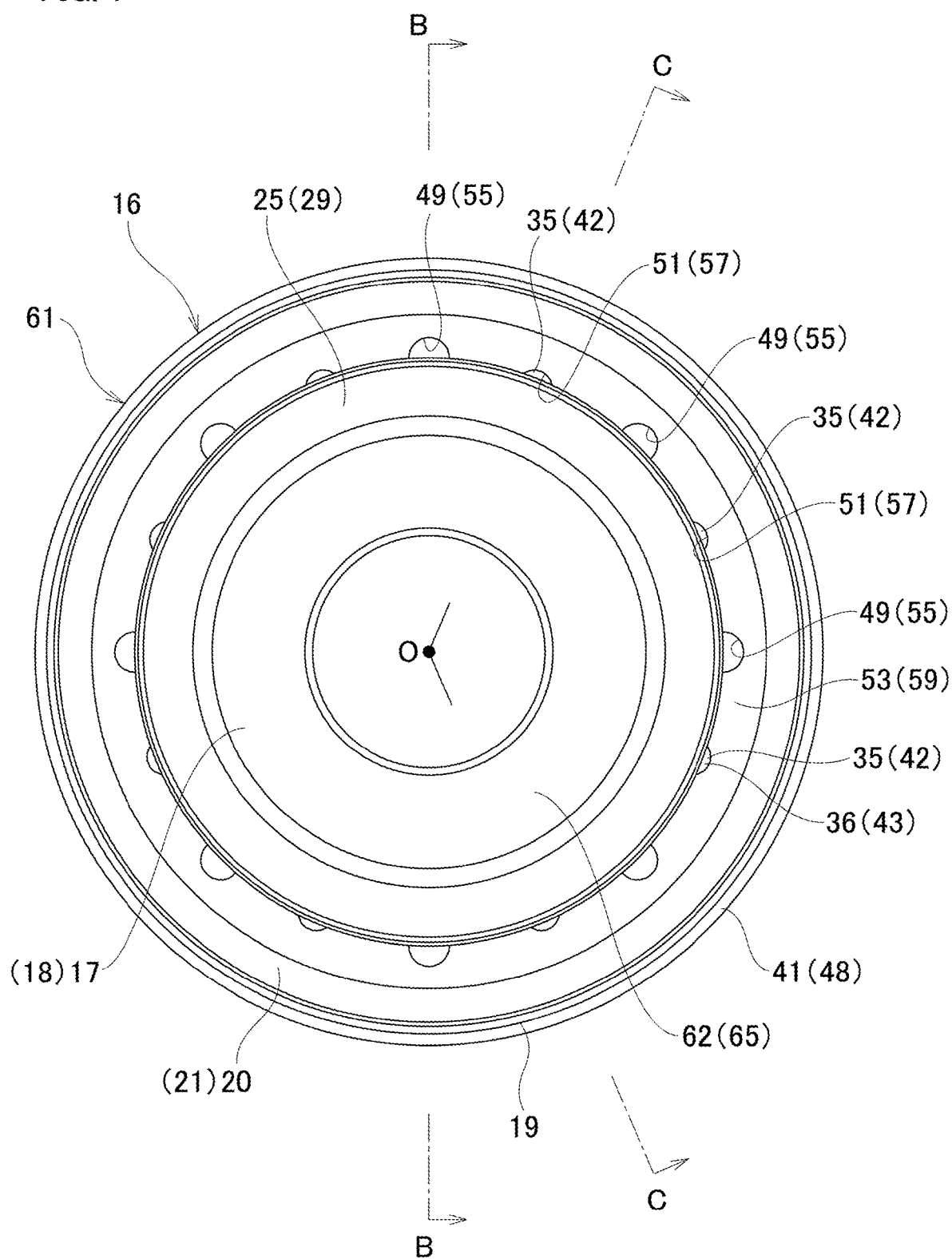
FIG. 7 is a view of the torque transmission joint according to the first example as viewed from the right side or the left side in FIG. 6.

The torque transmission joint 16 includes a first transmission member 17 and a second transmission member 18 that constitute a pair of end section transmission members, an intermediate transmission member 19, and a first elastic member 20 and a second elastic member 21 that constitute a pair of elastic members. More specifically, as illustrated in FIG. 5, the torque transmission joint 16 includes the first transmission member 17, the first elastic member 20, the intermediate transmission member 19, the second elastic member 21 and the second transmission member 18 that are arranged and assembled in this order from one side in the axial direction, which is the drive shaft side.

As illustrated in FIGS. 16A, 16B, and 16C, the intermediate transmission member 19 has an overall cylindrical shape. The intermediate transmission member 19 is made of a material having higher rigidity than the elastic material of the first elastic member 20 and the second elastic member 21, and for example, is formed by means such as injection molding, casting, forging, sintering, cutting or the like using a belt material of rubber reinforced with cloth, synthetic resin such as PPS, PEEK, polyamide, or the like mixed with reinforcing fiber as required, or metal such as an iron alloy, copper alloy, aluminum alloy or the like.

The intermediate transmission member 19 has a cylindrical main body section 31. The main body section 31 includes an intermediate concave-convex section 32 in which concave sections 33 and convex sections 34 are alternately arranged in the circumferential direction on the inner circumferential surface thereof, which is the circumferential surface on the one side in the radial direction.

The main body section 31 includes a plurality of first tooth sections 35 protruding in the axial direction at portions of the one side surface in the axial direction corresponding to the central sections in the circumferential direction of the convex sections 34 constituting the intermediate concave-convex section 32. Each first tooth section 35 has a substantially rectangular shape extending in the radial direction of the main body section 31 when viewed from the axial direction. Moreover, each first tooth section 35 has an inclined side surface section 36 that is provided on the surface of the one side in the axial direction, which is the tip-end surface thereof, and that extends from the outer end section in the radial direction to an intermediate section in the radial direction. The inclined side surface section 36 is inclined in a direction toward the inside in the axial direction of the intermediate transmission member 19 (the other side in the axial direction) while going outward in the radial direction. In addition, of the plurality of first tooth sections 35, every other first tooth section 35 arranged in the circumferential direction includes a first engaging protrusion 37 in one half section in the axial direction of the inner side surface in the radial direction that protrudes inward in the radial direction. The inner side surface in the axial direction (the other side surface in the axial direction) of the first engaging protrusion 37 is a plane orthogonal to the center axis of the intermediate transmission member 19.

The main body section 31 has an annular shaped first annular concave section 38 that opens on one side surface in the axial direction at a portion of the one side section in the axial direction that is farther on the outside in the radial direction of the first tooth portion 35. The inner diameter side circumferential surface 39 and the outer diameter side circumferential surface 40 of the inner surface of the first annular concave section 38 are cylindrical surfaces centered around the center axis of the main body section 31. Moreover, the main body section 31 has a cylindrical shaped first cylindrical section 41 on the outer end section in the radial direction of the section on the one side in the axial direction that protrudes to the one side in the axial direction. The inner circumferential surface of the first cylindrical section 41, together with the outer diameter side circumferential surface 40 of the first annular concave section 38, constitutes a single cylindrical surface.

The main body section 31 includes a plurality of second tooth sections 42 that protrude in the axial direction in portions corresponding to the central portions in the circumferential direction of the convex sections 34 of the intermediate concave-convex section 32 on the other side surface in the axial direction. Each second tooth section 42 has a substantially rectangular shape extending in the radial direction of the main body section 31 when viewed from the axial direction. Moreover, each second tooth section 42 has an inclined side surface section 43 that extends from the outer end section in the radial direction to an intermediate section in the radial direction on the other side surface in the axial direction, which is the front-end surface. The inclined side surface section 43 is inclined in a direction toward the inside in the axial direction of the intermediate transmission member 19 (the one side in the axial direction) while going toward the outside in the radial direction. In addition, of the plurality of second tooth sections 42, every other second tooth section 42 arranged in the circumferential direction includes a second engaging protrusion 44 on the other half section in the axial direction of the inner side surface in the radial direction that protrudes inward in the radial direction. The inner side surface in the axial direction (one side surface in the axial direction) of the second engaging protrusion 44 is a plane orthogonal to the center axis of the intermediate transmission member 19.

The main body section 31 has an annular shaped second annular concave section 45 that opens to the surface on the other side in the axial direction at a portion of the other side section in the axial direction that is farther on the outside in the radial direction than the second tooth sections 42. An inner diameter side circumferential surface 46 and an outer diameter side circumferential surface 47 of the inner surface of the second annular concave section 45 are cylindrical surfaces that are centered around the center axis of the main body section 31. In addition, the main body section 31 has a cylindrical shaped second cylindrical section 48 in the outer end section in the radial direction of the section of the other side in the axial direction that protrudes to the other side in the axial direction. The inner circumferential surface of the second cylindrical section 48, together with the outer diameter side circumferential surface 47 of the second annular concave section 45, constitutes a single cylindrical surface.

In this example, the arrangement phases of the first engaging protrusions 37 and the second engaging protrusions 44 in the circumferential direction are shifted from each other by a half pitch. In addition, in this example, except that the phases of the arrangement of the first engaging protrusions 37 and the second engaging protrusions 44 in the circumferential direction are shifted from each other by a half pitch, both half sections in the axial direction of the intermediate transmission member 19 have a mirror-symmetric shape.

Note that when carrying out the present invention, the number of the first engaging protrusions 37 and the second engaging protrusions 44 may be less than the number of the present example, or may be more than the number of the present example.

As illustrated in FIGS. 14A and 14B, the first transmission member 17 has an overall annular shape. The first transmission member 17 is formed by a method of injection molding, casting, forging, sintering, cutting, or the like, using a synthetic resin mixed with reinforcing fibers as necessary, or a metal such as an iron alloy, a copper alloy, an aluminum alloy or the like. The first transmission member 17 is externally fixed to the tip-end section of the output shaft 12a in a state in which relative rotation and relative displacement in the axial direction are prevented by a method such as interference fitting, spline fitting, caulking or the like. However, the first transmission member 17 may also be formed integrally with the tip-end section of the output shaft 12a.

The first transmission member 17 includes a cylindrical section 62, a first concave-convex section 22 corresponding to an end section side concave-convex section, a first flange section 25, and a first preliminary engagement section 63. The cylindrical section 62 is externally fixed to the output shaft 12a via an inner circumferential surface that is a circumferential surface on the one side in the radial direction. The first concave-convex section 22 has concave sections 23 and convex sections 24 arranged so as to alternate at equal pitches in the circumferential direction in a portion existing from the other end section to the middle section in the axial direction of the outer circumferential surface which is a circumferential surface on the other side in the radial direction of the cylindrical section 62. Each convex section 24 of the first concave-convex section 22 extends outward in the radial direction from the portion existing from the other end section to the middle section in the axial direction of the outer circumferential surface of the cylindrical section 62, and has both side surfaces in the circumferential direction that are parallel with each other. The first flange section 25 has an annular shape and extends radially outward from the outer circumferential surface of the section on the one end in the axial direction of the cylindrical section 62. The opening on the one side in the axial direction of each concave section 23 of the first concave-convex section 22 is covered by a positioning side surface 30a, which is that is a surface on the other side in the axial direction of the first flange section 25. Note that when carrying out the present invention, the first flange section 25 may be omitted. The first preliminary engagement section 63 is configured by arranging a plurality of preliminary pieces 64 protruding toward the other side in the axial direction on the inner side surface in the axial direction (surface on the other side in the axial direction) of the cylindrical section 62 at an equal pitch in the circumferential direction. Each preliminary piece 64 has a fan shape centered around the center axis of the cylindrical section 62 when viewed from the axial direction, and a center angle width equal to or less than half the center angle width of the concave sections 23 of the first concave-convex section 22. The number of preliminary pieces 64 is the same as the number of concave sections 23 (convex sections 24) of the first concave-convex section 22. Each of the preliminary pieces 64 is arranged inside a range in the circumferential direction interposed between the respective central positions in the circumferential direction of the concave sections 23 and the convex sections 24 that are respectively adjacent to each other in the circumferential direction of the concave sections 23 and the convex sections 24 of the first concave-convex section 22.

Figure 15A:
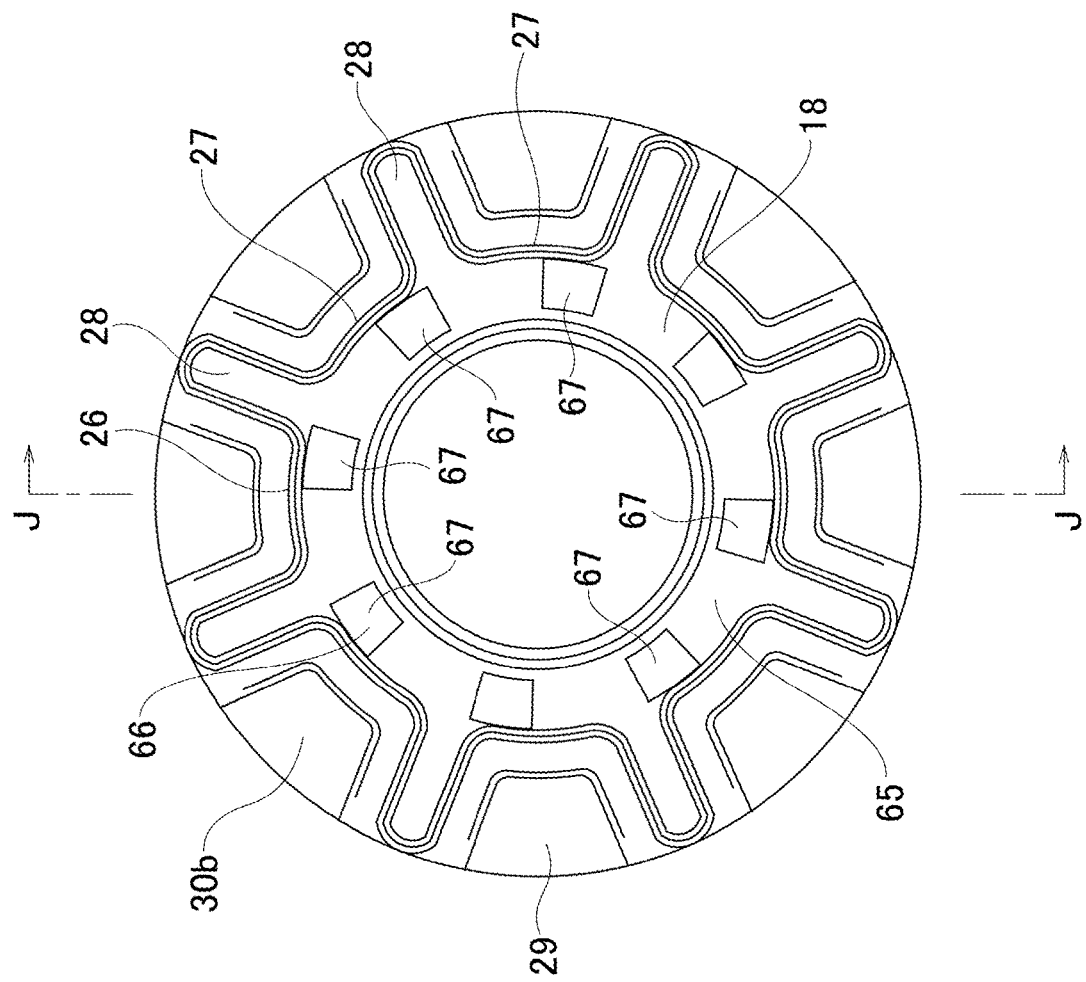
FIG. 15A is a diagram illustrating a second transmission member of the torque transmission joint according to the first example as seen from the right side in FIG. 5.
Figure 15B:
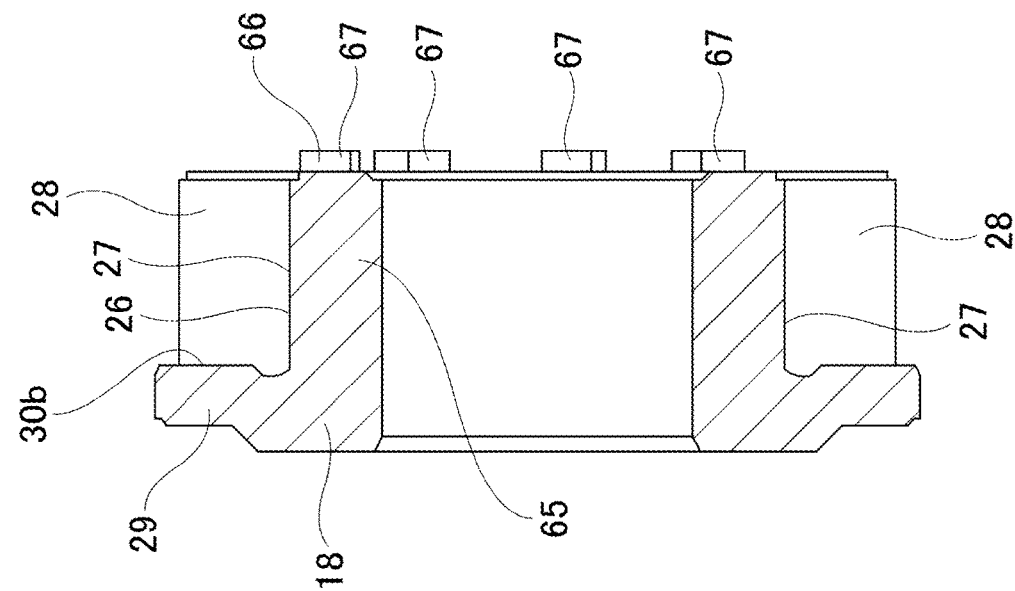
FIG. 15B is a cross-sectional view of section J-J in FIG. 15A.

As illustrated in FIGS. 15A and 15B, the second transmission member 18 has an overall annular shape. The second transmission member 18 is formed by a method such as injection molding, casting, forging, sintering, cutting, or the like, using a synthetic resin mixed with reinforcing fibers as necessary, or a metal such as an iron alloy, a copper alloy, an aluminum alloy or the like. The second transmission member 18 is externally fixed to the base end section of the worm shaft 6a in a state in which relative rotation and relative displacement in the axial direction are prevented by a method such as interference fitting, spline fitting, caulking or the like. However, the second transmission member 18 may also be integrally formed in the base end section of the worm shaft 6a.

The second transmission member 18 includes a cylindrical section 65, a second concave-convex section 26 corresponding to an end section side concave-convex section, a second flange section 29, and a second preliminary engagement section 66. The cylindrical section 65 is externally fixed to the base end section of the worm shaft 6a via an inner circumferential surface that is a circumferential surface on the one side in the radial direction. The second concave-convex section 26 has concave sections 27 and convex sections 28 arranged so as to alternate at equal pitches in the circumferential direction in a portion existing from the one end section to the middle section in the axial direction of the outer circumferential surface which is a circumferential surface on the other side in the radial direction of the cylindrical section 65. Each convex section 28 of the second concave-convex section 26 extends outward in the radial direction from the portion existing from the one end section to the middle section in the axial direction of the outer circumferential surface of the cylindrical section 65, and has both side surfaces in the circumferential direction that are parallel to each other. The second flange section 29 has an annular shape and extends outward in the radial direction from the outer circumferential surface of the section on the other end in the axial direction of the cylindrical section 65. The opening on the other side in the axial direction of the concave section 27 of the second concave-convex section 26 is closed by a positioning side surface 30b that is a surface on the one side in the axial direction of the second flange section 29. Note that when carrying out the present invention, the second flange section 29 may also be omitted. The second preliminary engagement section 66 is configured by arranging a plurality of preliminary pieces 67 protruding toward the one side in the axial direction on the inner side surface in the axial direction (surface on the one side in the axial direction) of the cylindrical section 65 at an equal pitch in the circumferential direction. Each preliminary piece 67 has a fan shape centered around the center axis of the cylindrical section 65 when viewed from the axial direction, and has a center angle width equal to or less than half the center angle width of the concave section 27 of the second concave-convex section 26. The number of preliminary pieces 67 is the same as the number of concave sections 27 (convex sections 28) of the second concave-convex section 26. Each of the preliminary pieces 67 is arranged inside a range in the circumferential direction interposed between the respective central positions in the circumferential direction of the concave section 27 and the convex section 28 that are respectively adjacent to each other in the circumferential direction of the concave sections 27 and the convex sections 28 of the second concave-convex section 26.

Note that in this example, the first transmission member 17 and the second transmission member 18 are formed in the same shape and the same size. Therefore, in this example, the first transmission member 17 and the second transmission member 18 may share parts.

Figure 17C:
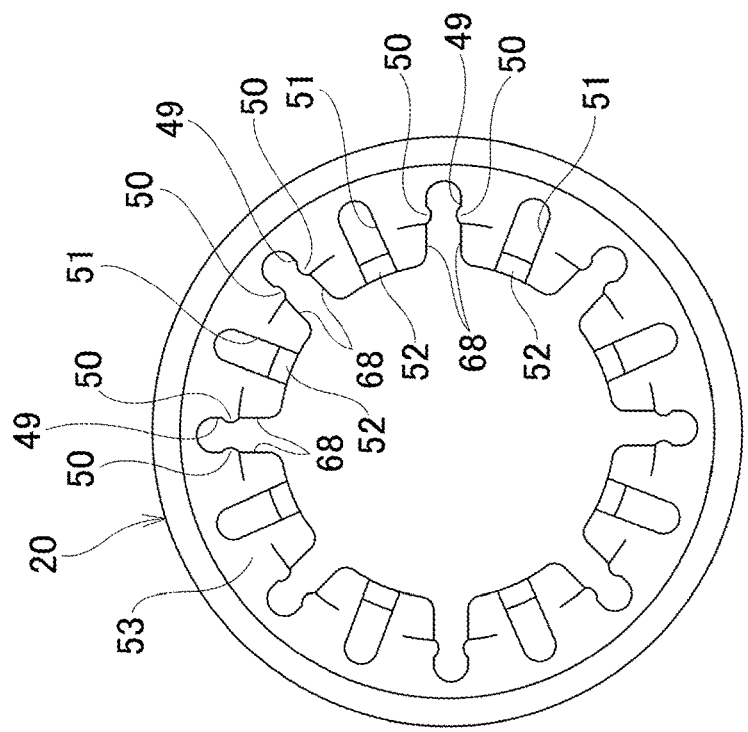
FIG. 17C is a view illustrating the first elastic member as seen from the right side in FIG. 5.
Figure 17B:
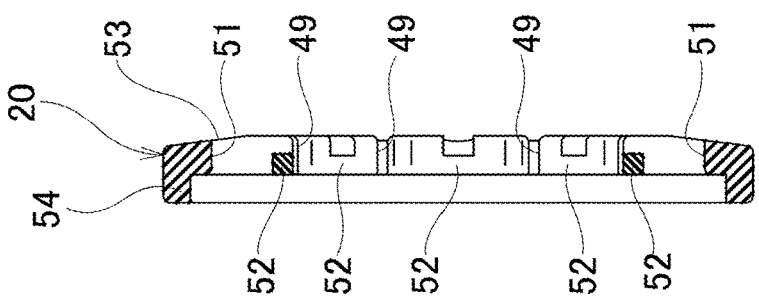
FIG. 17B is a cross-sectional view of section L-L in FIG. 17A.
Figure 17A:
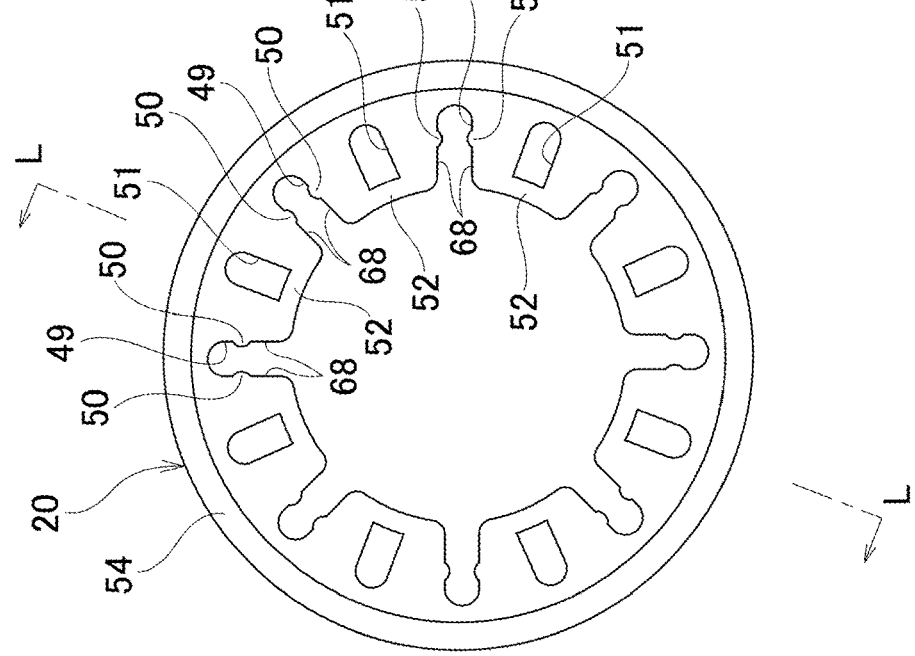
FIG. 17A is a view illustrating the first elastic member according to the first example as seen from the left side in FIG. 5.

As illustrated in FIGS. 17A, 17B, and 17C, the first elastic member 20 has an overall annular shape. The first elastic member 20 is formed of an elastic material such as rubber (NBR, HNBR, or the like), elastomer (polyurethane, silicon, or the like) or the like that has lower rigidity than the intermediate transmission member 19. The first elastic member 20 is assembled in the section on the one side in the axial direction of the intermediate transmission member 19.

The first elastic member 20 includes first elastic slits 49 at a plurality of locations having the same phase in the circumferential direction as the concave sections 33 of the intermediate concave-convex section 32. Each first elastic slit 49 extends in the radial direction of the first elastic member 20 and opens at the inner circumferential edge of the first elastic member 20. The first elastic member 20 includes elastic protrusions 50 that protrude in the circumferential direction toward the center of the first elastic slits 49 at portions near the outer ends in the radial direction of the edges on both sides in the circumferential direction of the first elastic slits 49. When viewed from the axial direction, the elastic protrusions 50 have a convex arc-shaped tip-end surface. Moreover, the portions of the edges on both sides in the circumferential direction of the first elastic slits 49 that are separated from the elastic protrusions 50 are flat sections 69 that are parallel to each other. Note that when carrying out the present invention, the shape of the tip-end surface of the elastic protrusions 50 viewed from the axial direction is not limited to a convex arc shape, and may be other shapes such as a triangle, a trapezoid or the like. The position in the radial direction of the elastic protrusions 50 with respect to the edges on both sides in the circumferential direction of the first elastic slits 49 may be a radial position different from the present example. Moreover, the number of elastic protrusions provided on each of the edges on both sides in the circumferential direction of the first elastic slits 49 is not limited to one, and may be plural. Furthermore, the elastic protrusions 50 may be omitted, and the entire edge of the edges on both sides in the circumferential direction of the first elastic slits may be flat sections that are parallel to each other.

The first elastic member 20 includes first through holes 51 corresponding to thin sections at a central section in the circumferential direction between first elastic slits 49 that are adjacent in the circumferential direction. Each first through hole 51 has a substantially rectangular shape extending in the radial direction of the first elastic member 20 when viewed from the axial direction. The first elastic member 20 includes first engaging beams 52 at locations sandwiched between the inner circumferential surface of the first elastic member 20 and the first through holes 51 in the radial direction. Of the surface on the one side in the axial direction of the first elastic member 20, the locations corresponding to the first engagement beams 52 are recessed toward the other side in the axial direction. Moreover, the surface on the one side in the axial direction of the first elastic member 20 has an inclined side surface section 53 in the middle section in the radial direction. The inclined side surface section 53 is inclined in a direction toward the other side in the axial direction that is the inside in the axial direction of the intermediate transmission member 19 while going toward the outside in the radial direction.

The first elastic member 20 has an annular-shaped first annular convex section 54 projecting to the other side in the axial direction on the outer end section in the radial direction located farther on the outside in the radial direction than the first elastic slits 49 and the first through holes 51.

Figure 8:
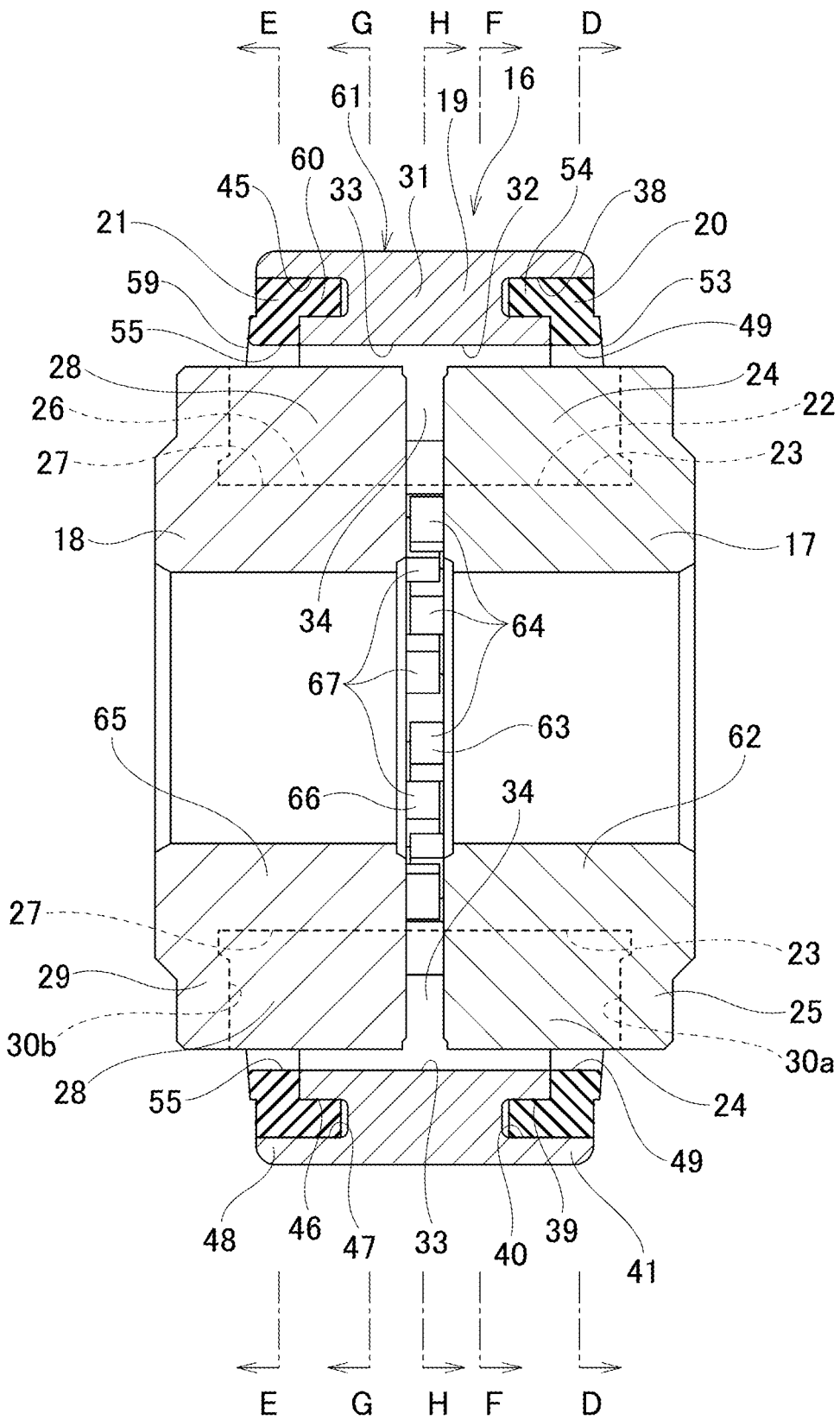
FIG. 8 is a cross-sectional view of section B-B in FIG. 7.
Figure 9:
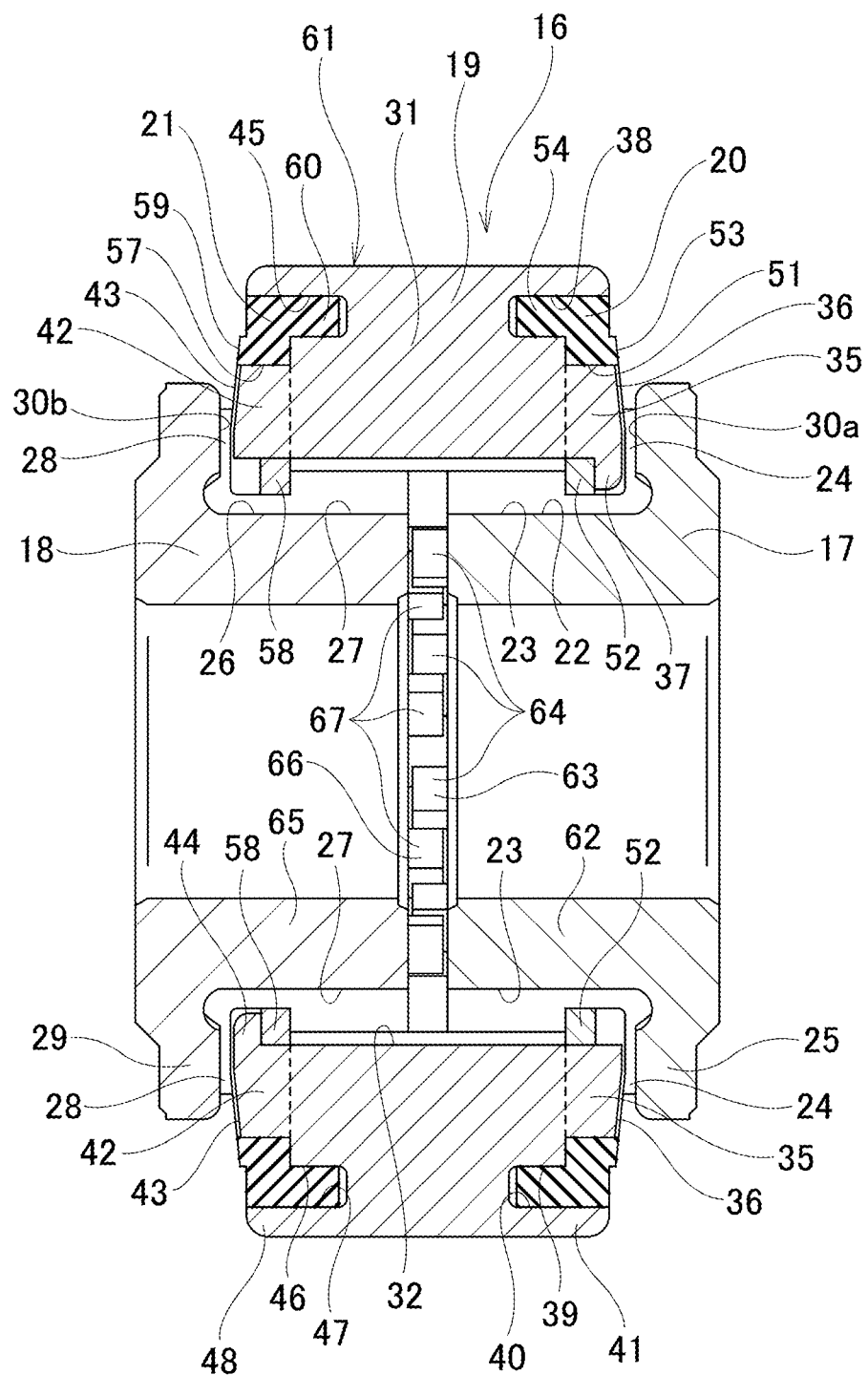
FIG. 9 is a cross-sectional view of section C-O-C in FIG. 7.
Figure 10:
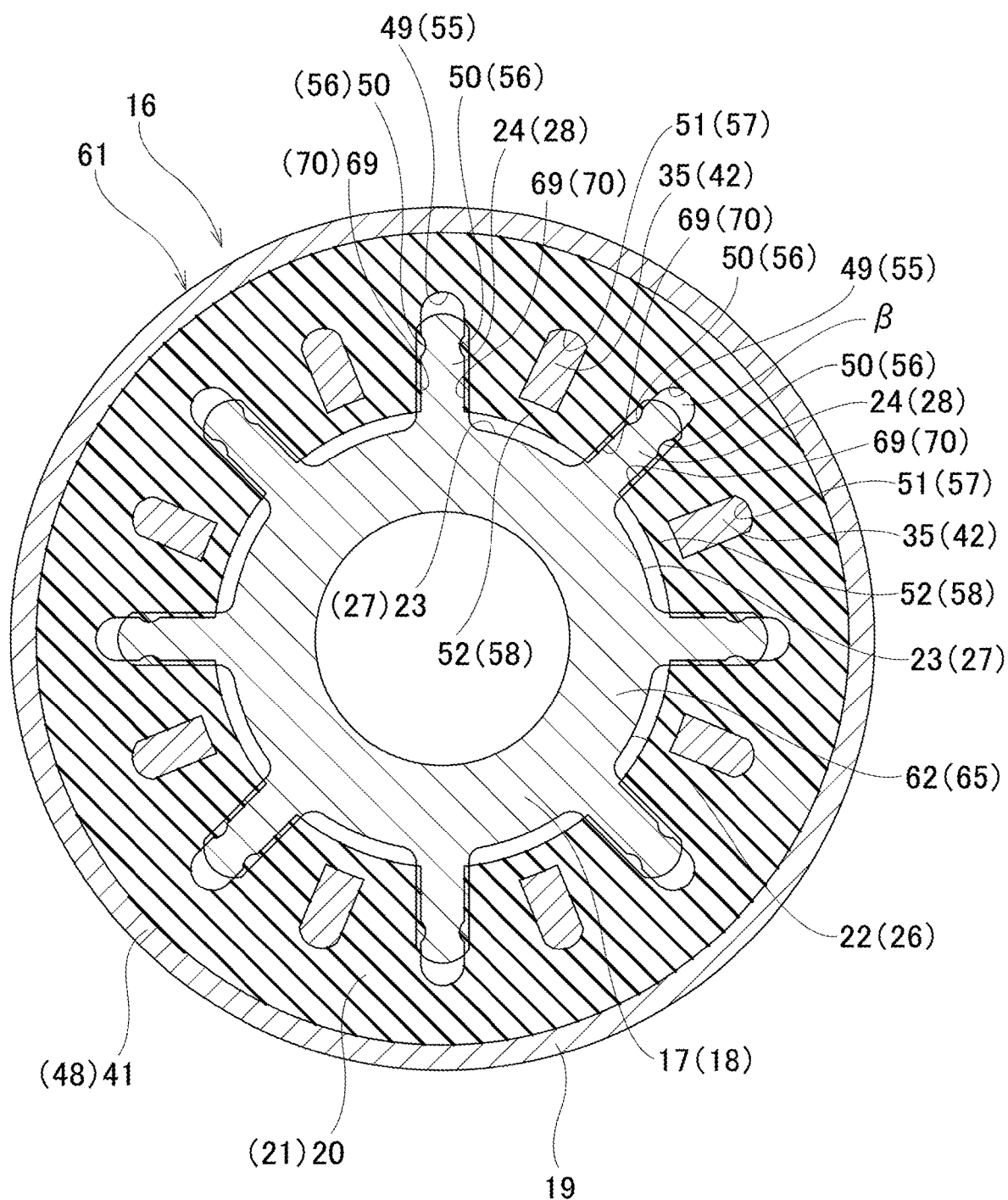
FIG. 10 is a cross-sectional view of section D-D or section E-E in FIG. 8.
Figure 13:
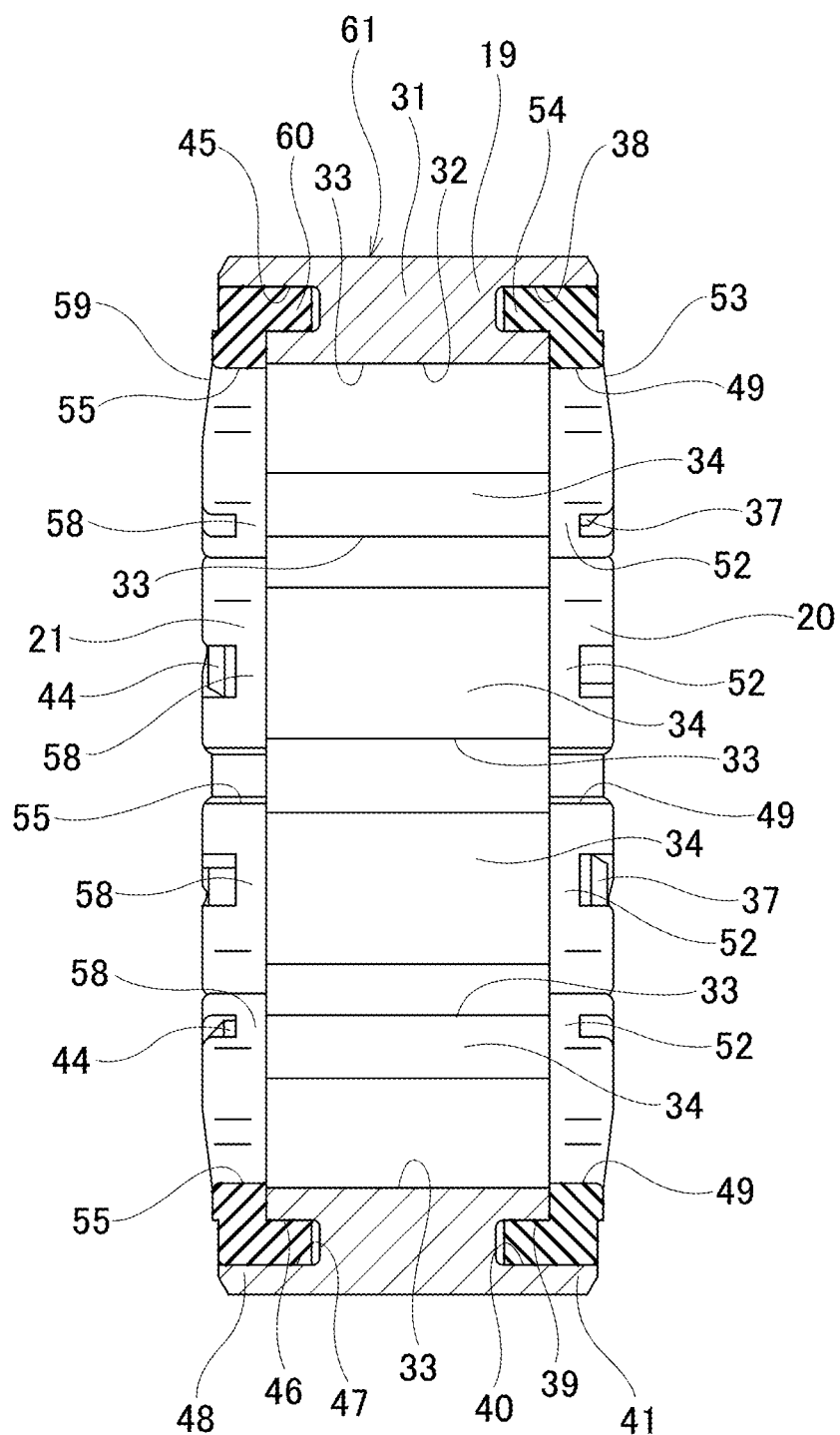
FIG. 13 is a cross-sectional view of section B-B in FIG. 7, and illustrates an intermediate transmission member, a first elastic member, and a second elastic member taken out from the torque transmission joint according to the first example.

As illustrated in FIGS. 8, 9, and 13, the first elastic member 20 is assembled in the section on the one side in the axial direction of the intermediate transmission member 19 and covers the surface on the one side in the axial direction of the intermediate transmission member 19. In this state, the first tooth sections 35 engage with the inside of the first through holes 51 so that, with respect to the circumferential direction and radial direction, at least looseness in the circumferential direction is not allowed. In this example, transmission of torque between the intermediate transmission member 19 and the first elastic member 20 is possible based on the engagement between the first through holes 51 and the first tooth sections 35. Note that in the engagement sections between the first through holes 51 and the first tooth sections 35, there may be looseness in the radial direction or circumferential direction.

Moreover, the first engaging beams 52 are engaged with the other side surface in the axial direction of the first engaging protrusions 37. As a result, the displacement to one side in the axial direction of the first elastic member 20 with respect to the intermediate transmission member 19 is prevented, and separation of the intermediate transmission member 19 and the first elastic member 20 is prevented. In addition, when the first annular convex section 54 is press-fitted inside the first annular concave section 38, the first annular convex section 54 is elastically compressed by the inner diameter side circumferential surface 39 and the outer diameter side circumferential surface 40 that constitute the inner surface of the first annular concave section 38. In other words, in this state, the inner diameter side circumferential surface 39, the outer diameter side circumferential surface 40, and both circumferential surfaces of the first annular convex section 54 come in elastic contact with each other and are engaged by a strong frictional engagement. Moreover, the outer circumferential surface of the first elastic member 20 is fitted into the inner circumferential surface of the first cylindrical section 41 by an interference fit, and the outer circumferential surface of the first elastic member 20 and the inner circumferential surface of the first cylindrical section 41 come in elastic contact with each other and are engaged by a strong frictional engagement. In this example, the frictional engagement between these circumferential surfaces also prevents displacement of the first elastic member 20 to the one side in the axial direction with respect to the intermediate transmission member 19, and thus prevents separation of the intermediate transmission member 19 and the first elastic member 20. Furthermore, in this example, the outer circumferential surface of the first elastic member 20 is covered by the first cylindrical section 41. As a result, during conveyance, it is possible to prevent other parts from colliding with or getting caught on the outer circumferential surface of the first elastic member 20, and separation of the intermediate transmission member 19 and the first elastic member 20 is prevented. It should be noted that when carrying out the present invention, the circumferential surface of the first annular convex section 54 may be brought into elastic contact (fitted with an interference fit) with only one circumferential surface of the inner diameter side circumferential surface 39 and outer diameter side circumferential surface 40 that constitute the inner surface of the first annular concave section 38, and the circumferential surface of the first annular convex section 54 may be simply brought into contact (in a state where there is no interference fit) with the other circumferential surface of the inner diameter side circumferential surface 39 and outer diameter side circumferential surface 40, or the surfaces may face each other via a gap without being in contact. Moreover, the outer circumferential surface of the first elastic member 20 may be simply brought into contact with the inner circumferential surface of the first cylindrical section 41, or may face the inner circumferential surface via a gap without being in contact.

The surface on the one side in the axial direction of the first elastic member 20 is positioned farther on the one side in the axial direction than the tip-end surfaces of the first tooth sections 35. In addition, the inner circumferential surface of the first elastic member 20 is positioned farther on the inside in the radial direction than the inner side surface in the radial direction of the convex sections 34 of the intermediate concave-convex section 32 and the edges of the inside end in the radial direction of the first engaging protrusions 37.

As illustrated in FIGS. 18A, 18B, and 18C, the second elastic member 21 has an overall annular shape. The second elastic member 21 is formed of an elastic material such as rubber (NBR, HNBR, or the like), an elastomer (polyurethane, silicon, or the lie), or the like that has lower rigidity than the intermediate transmission member 19. The second elastic member 21 is assembled in the section on the other side in the axial direction of the intermediate transmission member 19.

The second elastic member 21 includes second elastic slits 55 at a plurality of locations having the same phase in the circumferential direction as the concave sections 33 of the intermediate concave-convex section 32. Each second elastic slit 55 extends in the radial direction of the second elastic member 21 and opens at the inner circumferential edge of the second elastic member 21. The second elastic member 21 includes elastic protrusions 56 that protrude in the circumferential direction toward the center of the second elastic slits 55 at portions near the outer ends in the radial direction of the edges on both sides in the circumferential direction of the second elastic slits 55. When viewed from the axial direction, the elastic protrusions 56 have a convex arc-shaped tip-end surface. Moreover, the portions of the edges on both sides in the circumferential direction of the second elastic slits 55 that are separated from the elastic protrusions 56 are flat sections 70 that are parallel to each other. Note that when carrying out the present invention, the shape of the tip-end surface of the elastic protrusions 56 viewed from the axial direction is not limited to a convex arc shape, and may be other shapes such as a triangle, a trapezoid or the like. The position in the radial direction of the elastic protrusions 56 with respect to the edges on both sides in the circumferential direction of the second elastic slits 55 may be a radial position different from the present example. Moreover, the number of elastic protrusions provided on each of the edges on both sides in the circumferential direction of the second elastic member 21 is not limited to one, and may be plural. Furthermore, the elastic protrusions 56 may be omitted, and the entire edge of the edges on both sides in the circumferential direction of the second elastic slits may be flat sections that are parallel to each other.

The second elastic member 21 includes second through holes 57 corresponding to thin sections at a central portion in the circumferential direction between second elastic slits 55 that are adjacent in the circumferential direction. Each second through hole 57 has a substantially rectangular shape extending in the radial direction of the second elastic member 21 when viewed from the axial direction. The second elastic member 21 includes second engaging beams 58 at locations sandwiched between the inner circumferential surface of the second elastic member 21 and the second through holes 57 in the radial direction. Of the surface on the other side in the axial direction of the second elastic member 21, the locations corresponding to the second engaging beams 58 are recessed toward the one side in the axial direction. Moreover, the surface on the other side in the axial direction of the second elastic member 21 has an inclined side surface section 59 in the middle section in the radial direction. The inclined side surface section 59 is inclined in a direction toward the one side in the axial direction that is the central side in the axial direction of the intermediate transmission member 19 while going toward the outside in the radial direction.

The second elastic member 21 has an annular shaped second annular convex section 60 projecting to the one side in the axial direction on the outer end section in the radial direction located farther on the outside in the radial direction than the second elastic slits 55 and the second through holes 57.

As illustrated in FIGS. 8, 9, and 13, the second elastic member 21 is assembled in the section on the other side in the axial direction of the intermediate transmission member 19 and covers the surface on the other side in the axial direction of the intermediate transmission member 19. In this state, the second tooth sections 42 engage with the inside of the second through holes 57 so that, with respect to the circumferential direction and radial direction, at least looseness in the circumferential direction is not allowed. In this example, transmission of torque between the intermediate transmission member 19 and the second elastic member 21 is possible based on the engagement between the second through holes 57 and the second tooth sections 42. Note that in the engagement sections between the second through holes 57 and the second tooth sections 42, there may be looseness in the radial direction or circumferential direction.

Moreover, the second engaging beams 58 are engaged with the one side surface in the axial direction of the second engaging protrusions 44. As a result, the displacement to the other side in the axial direction of the second elastic member 21 with respect to the intermediate transmission member 19 is prevented, and separation of the intermediate transmission member 19 and the second elastic member 21 is prevented. In addition, when the second annular convex section 60 is press-fitted inside the second annular concave section 45, the second annular convex section 60 is elastically compressed by the inner diameter side circumferential surface 46 and the outer diameter side circumferential surface 47 that constitute the inner surface of the second annular concave section 45. In other words, in this state, the inner diameter side circumferential surface 46, the outer diameter side circumferential surface 47, and both circumferential surfaces of the second annular convex section 60 come in elastic contact with each other and are engaged by a strong frictional engagement. Moreover, the outer circumferential surface of the second elastic member 21 is fitted into the inner circumferential surface of the second cylindrical section 48 by an interference fit, and the outer circumferential surface of the second elastic member 21 and the inner circumferential surface of the second cylindrical section 48 come in elastic contact with each other and are engaged by a strong frictional engagement. In this example, the frictional engagement between these circumferential surfaces also prevents displacement of the second elastic member 21 to the other side in the axial direction with respect to the intermediate transmission member 19, and thus prevents separation of the intermediate transmission member 19 and the second elastic member 21. Furthermore, in this example, the outer circumferential surface of the second elastic member 21 is covered by the second cylindrical section 48. As a result, during conveyance, it is possible to prevent other parts from colliding with or getting caught on the outer circumferential surface of the second elastic member 21, and separation of the intermediate transmission member 19 and the second elastic member 21 is prevented. It should be noted that when carrying out the present invention, the circumferential surface of the second annular convex section 60 may be brought into elastic contact (fitted with an interference fit) with only one circumferential surface of the inner diameter side circumferential surface 46 and outer diameter side circumferential surface 47 that constitute the inner surface of the second annular concave section 45, and the circumferential surface of the second annular convex section 60 may be simply brought into contact (in a state where there is no interference fit) with the other circumferential surface of the inner diameter side circumferential surface 46 and outer diameter side circumferential surface 47, or the surfaces may face each other via a gap without being in contact. Moreover, the outer circumferential surface of the second elastic member 21 may be simply brought into contact with the inner circumferential surface of the second cylindrical section 48, or may face the inner circumferential surface via a gap without being in contact.

The surface on the other side in the axial direction of the second elastic member 21 is positioned farther on the other side in the axial direction than the tip-end surfaces of the second tooth sections 42. In addition, the inner circumferential surface of the second elastic member 21 is positioned farther on the inside in the radial direction than the inner side surface in the radial direction of the convex sections 34 of the intermediate concave-convex section 32 and the edges of the inside end in the radial direction of the second engaging protrusions 44.

Note that in this example, the first elastic member 20 and the second elastic member 21 are formed in the same shape and the same size. Therefore, in this example, the first elastic member 20 and the second elastic member 21 may share parts.

In this example, with the joined body 61 of the intermediate transmission member 19, the first elastic member 20, and the second elastic member 21 in an assembled state, the inclined side surface sections 36, 53, 43, and 59 that are inclined in a direction toward the inside in the axial direction of the intermediate transmission member 19 while going in a direction toward the outer side in the radial direction exist at middle sections in the radial direction on the surfaces of both sides in the axial direction of the joined body 61.

In this example, with the joined body 61 in an assembled state, the first transmission member 17 from the other end section to the middle section in the axial direction is inserted from the one side in the axial direction into the inside in the radial direction of one side section in the axial direction of the joined body 61. The convex sections 24 of the first concave-convex section 22 engage with the first elastic slits 49 of the first elastic member 20 with a first circumferential gap interposed therebetween, and the convex sections 24 of the first concave-convex section 22 engage with the section on the one side in the axial direction of the concave sections 33 of the intermediate concave-convex section 32 of the intermediate transmission member 19 with a specified circumferential gap larger than the first circumferential gap interposed therebetween.

More specifically, the first circumferential gap is constituted by a negative gap. In other words, the convex sections 24 of the first concave-convex section 22 are press-fitted inside the first elastic slits 49, and the flat sections 69 ad the elastic protrusions 50 that constitute the edges on both sides in the circumferential direction of the first elastic slits 49 come in elastic contact with both side surface in the circumferential direction of the convex sections 24 (in a state having interference). Therefore, the convex sections 24 of the first concave-convex section 22 engage with the first elastic slits 49 without looseness in the circumferential direction. In particular, in this state, of the edges on both sides in the circumferential direction of the first elastic slits 49, the elastic protrusions 50 come in stronger elastic contact with both side surfaces of the convex sections 24 than the flat sections 69.

Figure 11:
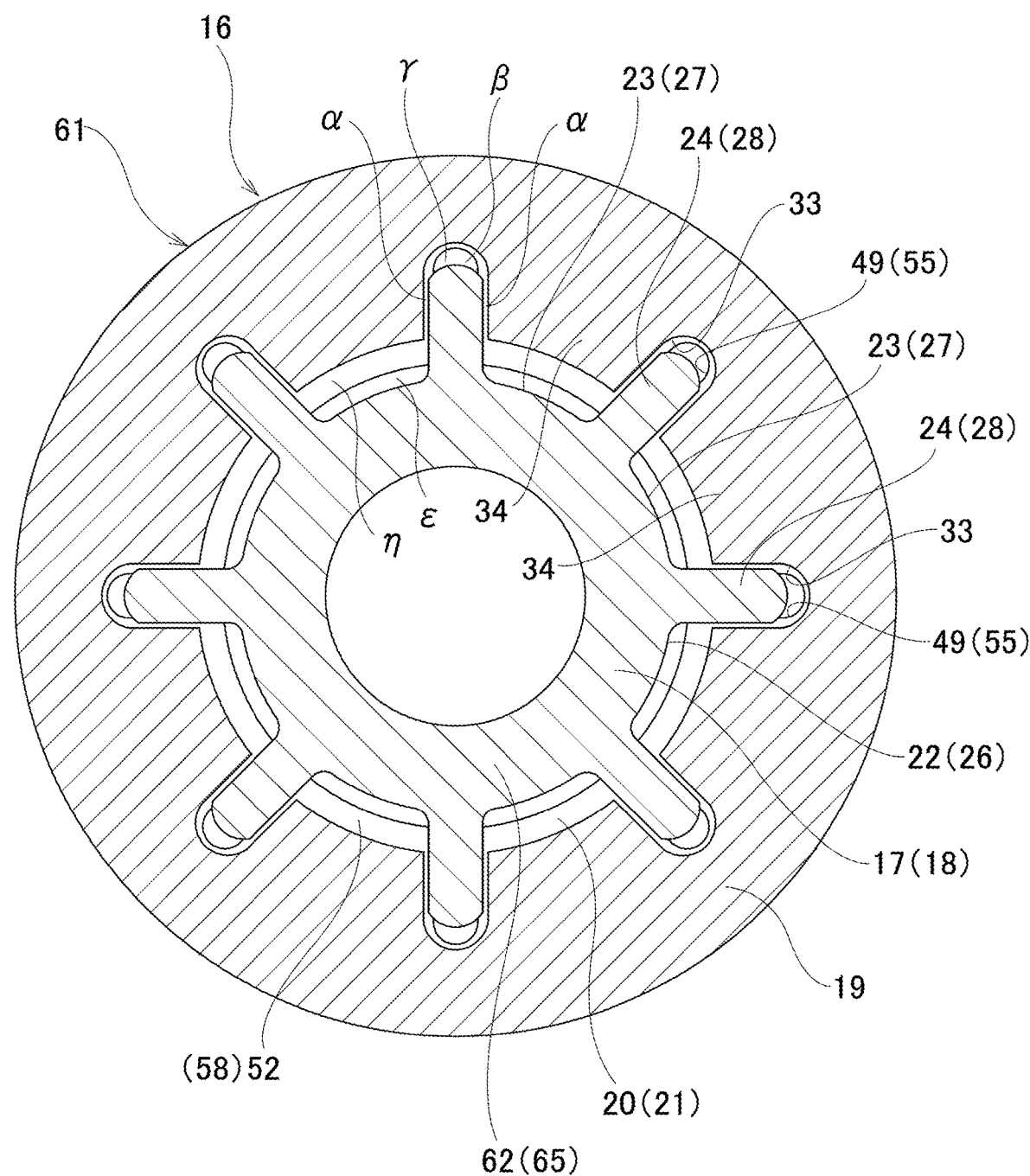
FIG. 11 is a cross-sectional view of section F-F or section G-G in FIG. 8.
Figure 12:
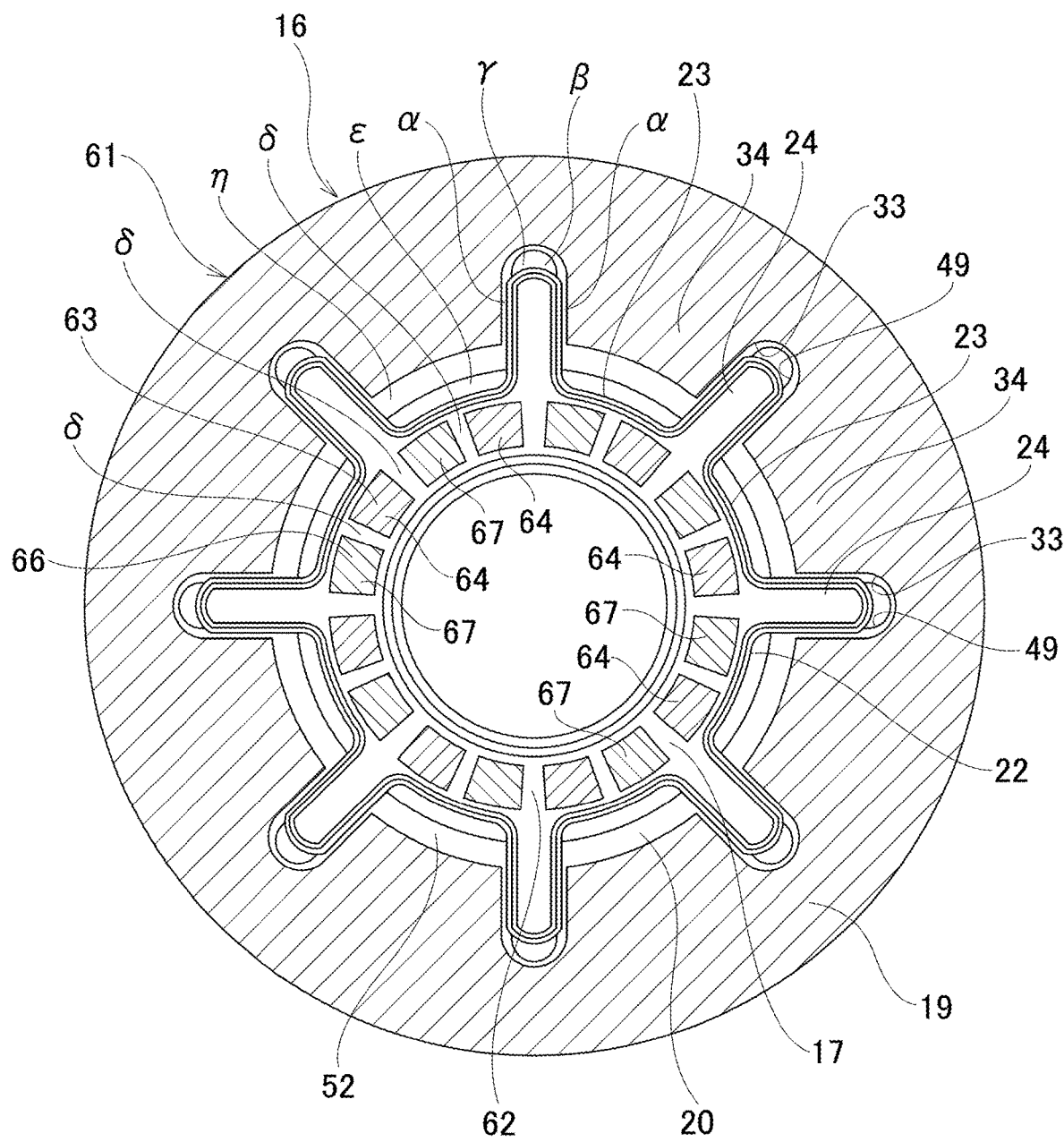
FIG. 12 is a cross-sectional view of section H-H in FIG. 8.

On the other hand, the specified circumferential gaps interposed in the engagement section between the convex sections 24 of the first concave-convex section 22 and the concave sections 33 of the intermediate concave-convex section 32 are constituted by positive gaps. In other words, the side surfaces in the circumferential direction of the convex sections 24 of the first concave-convex section 22 and the convex sections 34 of the intermediate concave-convex section 32 are not in contact with each other, and as illustrated in FIGS. 11 and 12, positive circumferential gaps α exist between these side surfaces in the circumferential direction. Moreover, the positioning side surface 30a, which is the other side surface in the axial direction of the first flange section 25, is brought close to or in contact with the surface on the one side in the axial direction of the joined body 61, and as a result, positioning in the axial direction of the first transmission member 17 with respect to the joined body 61 is achieved. Note that the first circumferential gaps may also be constituted by zero gaps. In other words, the edges on both sides in the circumferential direction of the first elastic slits 49 may be brought into contact with the surfaces on both sides in the circumferential direction of the convex sections 24 in a state of having no interference. Moreover, the first circumferential gaps may be constituted by positive gaps.

In this example, in this state, positive radial gaps β are interposed between the surfaces on the outer end in the radial direction of the convex sections 24 of the first concave-convex section 22 and the bottom surfaces of the first elastic slits 49. In addition, positive radial gaps γ are interposed between the surfaces on the outer end in the radial direction of the convex sections 24 of the first concave-convex section 22 and the bottom surfaces of the concave sections 33 of the intermediate concave-convex section 32 (refer to FIGS. 10 to 12). The radial gaps β are smaller than the radial gaps γ (β<γ). Positive radial gaps ε are interposed between the bottom surfaces of the concave sections 23 of the first concave-convex section 22 and the inner circumferential surface of the first elastic member 20. Moreover, positive radial gap η are interposed between the bottom surfaces of the convex sections 23 of the first concave-convex section 22 and the inner side surfaces in the radial direction, which are the tip-end surfaces, of the convex sections 34 of the intermediate concave-convex section 32 (refer to FIG. 11 and FIG. 12). The radial gaps ε are smaller than the radial gaps η (ε<η).

In this example, with the joined body 61 in an assembled state, the second transmission member 18 from the section on the one end to the middle section in the axial direction is inserted from the other side in the axial direction into the inside in the radial direction of the section on the other side in the axial direction of the joined body 61. The convex sections 28 of the second concave-convex section 26 engage with the second elastic slits 55 of the second elastic member 21 with second circumferential gaps interposed therebetween, and the convex sections 28 of the second concave-convex section 26 engage with the sections on the other side in the axial direction of the concave sections 33 of the intermediate concave-convex section 32 of the intermediate transmission member 19 with specified circumferential gaps larger than the second circumferential gaps interposed therebetween.

More specifically, the second circumferential gaps are constituted by negative gaps. In other words, the convex sections 28 of the second concave-convex section 26 are press-fitted inside the second elastic slits 55, and the flat sections 70 and the elastic protrusions 56 that constitute the edges on both sides in the circumferential direction of the second elastic slits 55 come in elastic contact with both side surfaces in the circumferential direction of the convex sections 28 (in a state having interference). Therefore, the convex sections 28 of the second concave-convex section 26 engage with the second elastic slits 55 without looseness in the circumferential direction. In particular, in this state, of the edges on both sides in the circumferential direction of the second elastic slits 55, the elastic protrusions 56 come in stronger elastic contact with both side surfaces of the convex sections 28 than the flat sections 70.

On the other hand, the specified circumferential gaps interposed in the engagement section between the convex sections 28 of the second concave-convex section 26 and the concave sections 33 of the intermediate concave-convex section 32 are constituted by positive gaps. In other words, the side surfaces in the circumferential direction of the convex sections 28 of the second concave-convex section 26 and the convex sections 34 of the intermediate concave-convex section 32 are not in contact with each other, and as illustrated in FIG. 11 and FIG. 12, positive circumferential gaps α exist between these side surfaces in the circumferential direction. Moreover, the positioning side surface 30b, which is the surface on the one side in the axial direction of the second flange section 29, is brought close to or in contact with the surface on the other side in the axial direction of the joined body 61, and as a result, positioning in the axial direction of the second transmission member 18 with respect to the joined body 61 is achieved. Note that the second circumferential gaps may also be constituted by zero gaps. In other words, the edges on both sides in the circumferential direction of the second elastic slits 55 may be brought into contact with the surfaces on both sides in the circumferential direction of the convex sections 28 in a state of having no interference. Moreover, the second circumferential gaps may be constituted by positive gaps.

In this example, in this state, positive radial gaps β are interposed between the surfaces on the outer end in the radial direction of the convex sections 28 of the second concave-convex section 26 and the bottom surfaces of the second elastic slits 55. In addition, positive radial gaps γ are interposed between the surfaces on the outer end in the radial direction of the convex sections 28 of the second concave-convex section 26 and the bottom surfaces of the concave sections 33 of the intermediate concave-convex section 32 (refer to FIGS. 10 to 12). The radial gaps β are smaller than the radial gaps γ (β<γ). Positive radial gaps ε are interposed between the bottom surfaces of the concave sections 27 of the second concave-convex section 26 and the inner circumferential surface of the second elastic member 21. Moreover, positive radial gaps β are interposed between the bottom surfaces of the convex sections 27 of the second concave-convex section 26 and the inner side surfaces in the radial direction, which are the tip-end surfaces, of the convex sections 34 of the intermediate concave-convex section 32 (refer to FIG. 11 and FIG. 12). The radial gaps ε are smaller than the radial gaps η (ε<η).

Furthermore, in this example, in this state, as illustrated in FIGS. 2, 8, 9, and 12, the first preliminary engagement section 63 and the second preliminary engagement section 66 respectively provided on the end sections in the axial direction on the sides close to each other of the first transmission member 17 and the second transmission member 18 engage with each other (overlap each other in the circumferential direction) via a circumferential gap. More specifically, the preliminary pieces 64 constituting the first preliminary engagement section 63 and the preliminary pieces 67 constituting the second preliminary engagement section 66 are alternately arranged one by one in the circumferential direction, and positive circumferential gaps δ exist between the preliminary pieces 64 and 67 that are adjacent in the circumferential direction. Moreover, the circumferential gaps δ are larger than twice the circumferential gaps α (δ>2α).

In addition, in the state of the assembled torque transmission joint 16 of this example, the first concave-convex section 22 and the second concave-convex section 26 of the first transmission member 17 and the second transmission member 18 constituting a pair of end section transmission members, are spaced apart from each other in the axial direction. The first concave-convex section 22 and the second concave-convex section 26 do not overlap each other in the circumferential direction.

In this example, the first concave-convex section 22 and the first preliminary engagement section 63 of the first transmission member 17 and the second concave-convex section 26 and the second preliminary engagement section 66 of the second transmission member 18 are configured to respectively have the same shape and the same size as each other. Moreover, the number of the preliminary pieces 64 of the first preliminary engagement section 63 is the same as the number of the concave sections 23 of the first concave-convex section 22, the number of the preliminary pieces 67 of the second preliminary engagement section 66 is the same as the number of the concave sections 27 of the second concave-convex section 26, and the preliminary pieces 64 and the preliminary pieces 67 are arranged at equal pitches in the circumferential direction, and are arranged inside the circumferential range between the respective central positions in the circumferential direction of the concave portions 23 and the convex sections 24, or the concave sections 27 and the convex sections 28, that are adjacent to each other in the circumferential direction. Therefore, by assembling the first transmission member 17 and the second transmission member 18 in the joined body 61 without considering the mutual phase relationship in the circumferential direction between the first transmission member 17 and the second transmission member 18, the preliminary pieces 64 of the first preliminary engagement section 63 and the preliminary pieces 67 of the second preliminary engagement section 66 are always arranged in a positional relationship as illustrated in FIG. 12.

In the electric power steering device of this example, when the torque transmitted between the output shaft 12a of the electric motor 8 and the worm 5 is relatively small, the rotational torque of the output shaft 12a is transmitted in order from the first transmission member 17 to the first elastic member 20 to the intermediate transmission member 19 to the second elastic member 21 to the second transmission member 18 and to the worm 5. In other words, the rotational torque of the output shaft 12a is transmitted from the first transmission member 17 to the first elastic member 20 via the engagement sections between the convex sections 24 of the first concave-convex section 22 and the first elastic slits 49. The torque transmitted to the first elastic member 20 is transmitted to the intermediate transmission member 19 via the engagement sections between the first elastic member 20 and the first tooth sections 35 of the intermediate transmission member 19. The torque transmitted to the intermediate transmission member 19 is transmitted to the second elastic member 21 via the engagement sections between the second tooth sections 42 of the intermediate transmission member 19 and the second elastic member 21. The torque transmitted to the second elastic member 21 is transmitted to the second transmission member 18 and the worm 5 via the engagement sections between the second elastic slits 55 and the convex sections 28 of the second concave-convex section 26.

On the other hand, when the torque transmitted between the output shaft 12a and the worm 5 increases, a part of the first elastic member 20 is elastically crushed in the circumferential direction between the convex sections 24 of the first concave-convex section 22 and the first tooth sections 35, and a part of the second elastic member 21 is elastically crushed in the circumferential direction between the convex sections 28 of the second concave-convex section 26 and the second tooth sections 42. The side surfaces in the circumferential direction of the convex sections 24 of the first concave-convex section 22, the convex sections 28 of the second concave-convex section 26, and the convex sections 34 of the intermediate concave-convex section 32 come in contact with each other. The force of this contact is weakened by elastic deformation of a part of the first elastic member 20 and the second elastic member 21, so the generation of abnormal noise accompanying the contact may be suppressed. In this state, a large part of the rotational torque of the output shaft 12a is transmitted to the intermediate transmission member 19 from the engagement sections between the first concave-convex section 22 and the intermediate concave-convex section 32, and a large part of the torque transmitted to the intermediate transmission member 19 is transmitted to the worm 5 from the engagement sections between the intermediate concave-convex section 32 and the second concave-convex section 26. Moreover, the remaining torque is transmitted from the output shaft 12a to the worm 5 in the same manner as in a case described above where the torque is small.

In this example, even when the rotation direction of the output shaft 12a of the electric motor 8 is reversed, the force of contact between sides in the circumferential direction of the convex sections 24 of the first concave-convex section 22, the convex sections 28 of the second concave-convex section 26, and the convex sections 34 of the intermediate concave-convex section 32 is weakened by elastic deformation of the first elastic member 20 and the second elastic member 21, so abnormal noise accompanying the contact is suppressed.

As described above, in the electric power steering device of the present example, the torsional rigidity of the torque transmission joint 16 has two-stage characteristics so as to decrease in a case where the torque to be transmitted is small, and increase in a case where the torque to be transmitted is large. However, when carrying out the present invention, for example, the circumferential gaps of the engagement sections between the convex sections 24 of the first concave-convex section 22 and the concave sections 33 of the intermediate concave-convex section 32, and the circumferential gaps of the engagement sections between the convex sections 28 of the second concave-convex section 26 and the concave sections 33 of the intermediate concave-convex section 32 may be made to be different from each other; the elasticity of the first elastic member 20 and the elasticity of the second elastic member 21 may be made to be different from each other; positive circumferential gaps may be provided in the engagement sections between the convex sections 24 of the first concave-convex section 22, and the first elastic slits 49 of the first elastic member 20 and in the engagement sections between the convex sections 28 of the second concave-convex section 26, and the second elastic slits 55 of the second elastic member 21; and furthermore, by making these circumferential gaps different from each other, the number of stages of the torsional rigidity of the torque transmission joint 16 may be more than two stages.

In this example, the radial gaps $\beta$, $\gamma$, $\varepsilon$, and $\eta$ are respectively interposed in the engagement sections between the first concave-convex section 22 and the first elastic member 20 and in the engagement sections between the first concave-convex section 22 and the intermediate concave-convex section 32. In addition, the middle sections in the radial direction of the surface on the one side surface in the axial direction of the joined body 61 are inclined side surface sections 36, 53 that incline in a direction toward the inside in the axial direction of the intermediate transmission member 19 while going toward the outside in the radial direction. Therefore, the inclinations of the center axes of the first transmission member 17 and the joined body 61 are allowed without difficulty.

Similarly, radial gaps $\beta$, $\gamma$, $\varepsilon$, and $\eta$ are respectively interposed in the engagement sections between the second concave-convex section 26 and the second elastic member 21 and in the engagement sections between the second concave-convex section 26 and the intermediate concave-convex section 32. In addition, the middle sections in the radial direction of the surface on the other side in the axial direction of the joined body 61 are inclined side surface sections 43, 59 that incline in a direction toward the center side in the axial direction of the intermediate transmission member 19 while going toward the outside in the radial direction. Therefore, the inclinations of the center axes of the second transmission member 18 and the joined body 61 are allowed without difficulty.

Therefore, even if misalignment such as an axial deviation or eccentricity of the output shaft 12a of the electric motor 8 and an axial deviation, inclination, eccentricity or the like of the worm shaft 6a occurs, the center axis of the joined body 61 is easily inclined with respect to the central axes of the first transmission member 17 and the second transmission member 18, so smooth torque transmission is performed.

As described above, in this example, the first elastic member 20 covers the surface on the one side in the axial direction of the main body section 31 of the intermediate transmission member 19, and the surface on the one side in the axial direction of the first elastic member 20 is located farther on the one side in the axial direction than the tip-end surface of the first tooth sections 35. In addition, the second elastic member 21 covers the surface on the other side in the axial direction of the main body section 31 of the intermediate transmission member 19, and the surface on the other side in the axial direction of the second elastic member 21 is located farther on the other side in the axial direction than the tip-end surfaces of the second tooth sections 42. Therefore, even when large eccentricity, inclination, or the like occurs between the first transmission member 17 and the second transmission member 18, due to the presence of the first elastic member 20, the positioning side surface 30a, which is the surface on the other side in the axial direction of the first flange section 25, is prevented from coming in contact with the surface on the one side in the axial direction of the main body section 31 and the tip-end surfaces of the first tooth sections 35. Moreover, due to the presence of the second elastic member 21, the positioning side surface 30b, which is the surface on the one side in the axial direction of the second flange section 29, is prevented from coming in contact with the surface on the other side in the axial direction of the main body section 31 and the tip-end surfaces of the second tooth sections 42.

In this case, even supposing that the first elastic member 20 is crushed elastically, and the positioning side surface 30a comes into contact with the tip-end surface of the first tooth sections 35, or the second elastic member 21 is crushed elastically, and the positioning side surface 30b comes into contact with the tip-end surface of the second tooth sections 42, the force of the contact is weakened by the elastic deformation of the first elastic member 20 or the second elastic member 21, so the generation of abnormal noise due to the contact is suppressed.

As described above, in this example, the inner circumferential surface of the first elastic member 20 is located farther on the inside in the radial direction than the inner side surfaces in the radial direction of the convex sections 34 of the intermediate concave-convex section 32 and the edges on the inside end in radial direction of the first engaging protrusions 37. Moreover, the inner circumferential surface of the second elastic member 21 is located farther on the inside in the radial direction than the inner side surface in the radial direction of the convex sections 34 of the intermediate concave-convex section 32 and the edges on the inside end in radial direction of the second engaging protrusions 44. Furthermore, in regard to the radial gaps $\beta$, $\gamma$, $\epsilon$, and $\eta$, the relationships of $\beta<\gamma$ and $\epsilon<\eta$ are applied. Consequently, even in a case where large eccentricity, inclination or the like occurs between the first transmission member 17 and the second transmission member 18, due to the presence of the first elastic member 20, the bottom surfaces of the convex sections 23 of the first concave-convex section 22 are prevented from coming in contact with the inner side surfaces in the radial direction of the convex sections 34 of the intermediate concave-convex section 32, or the section on the inner end in the radial direction of the first engaging protrusion 37, and the outer side surfaces in the radial direction of the convex sections 24 of the first concave-convex section 22 are prevented from coming in contact with the bottoms surface of the concave sections 33 of the intermediate concave-convex section 32. In addition, due to the presence of the second elastic member 21, the bottom surfaces of the convex sections 27 of the second concave-convex section 26 are prevented from coming in contact with the inner side surfaces in the radial direction of the convex sections 34 of the intermediate concave-convex section 32 or the section on the inner end in the radial direction of the second engaging protrusion 44, and the outside surfaces in the radial direction of the convex sections 28 of the second concave-convex section 26 are prevented from coming in contact with the bottom surfaces of the concave sections 33 of the intermediate concave-convex section 32.

In this case, even supposing that the end section in the radial direction of the first elastic member 20 or the first elastic slits 49 are crushed elastically, and the bottom surfaces of the concave sections 23 of the first concave-convex section 22 come in contact with the inner side surfaces in the radial direction of the convex sections 34 of the intermediate concave-convex section 32, or the inner end sections in the radial direction of the first engaging protrusions 37, and the surfaces on the outer ends in the radial direction of the convex sections 24 of the first concave-convex section 22 come in contact with the bottom surfaces of the convex sections 33 of the intermediate concave-convex section 32, or supposing that the inside end section in the radial direction of the second elastic member 21 or the second elastic slits 55 are crushed elastically, and the bottom surfaces of the concave section 27 of the second concave-convex section 26 come in contact with the inner side surfaces in the radial direction of the convex sections 34 of the intermediate concave-convex section 32 or the inside end sections in the radial direction of the second engaging protrusions 44, and the outer end surfaces in the radial direction of the convex sections 28 of the second concave-convex section 26 come in contact with the bottom surfaces of the convex sections 33 of the intermediate concave-convex section 32, the force of the contact is weakened by the elastic deformation of the first elastic member 20 or the second elastic member 21, so the generation of abnormal noise accompanying the contact is suppressed.

As described above, in this example, the preliminary pieces 64 of the first preliminary engagement section 63 provided on the section on the other end in the axial direction of the first transmission member 17, and the preliminary pieces 67 of the second preliminary engagement section 66 provided on the section on the one end in the axial direction of the second transmission member 18 are alternately arranged one by one in the circumferential direction. Moreover, there are positive circumferential gaps $\delta$ between the preliminary pieces 64 and 67 adjacent in the circumferential direction. Furthermore, the circumferential gaps $\delta$ are more than twice as large as the circumferential gaps $\alpha$ ($\delta>2\alpha$). Therefore, in a state where the torque transmission function of the intermediate transmission member 19 is not deteriorated and the intermediate transmission member 19 exhibits a normal torque transmission function, even in a case where the torque transmitted between the output shaft 12a and the worm 5 increases, the positive circumferential gaps δ that exist between the preliminary pieces 64, 67 adjacent in the circumferential direction will not disappear, and the side surfaces in the circumferential direction of the preliminary pieces 64, 67 adjacent in the circumferential direction will not come in contact. In other words, in a state where the intermediate transmission member 19 exhibits a normal torque transmission function, torque is not directly transmitted from the first transmission member 17 to the second transmission member 18.

On the other hand, in this example, in a case where the torque transmission function by the intermediate transmission member 19 is deteriorated due to cracking or the like in the intermediate transmission member 19, the side surfaces in the circumferential direction of the preliminary pieces 64 of the first preliminary engagement section 63 and the preliminary pieces 67 of the second preliminary engagement section 66 adjacent in the circumferential direction come into contact with each other, and torque is directly transmitted from the first transmission member 17 to the second transmission member 18. In other words, in this example, even when the torque transmission function by the intermediate transmission member 19 is deteriorated, the torque is directly transmitted from the first transmission member 17 to the second transmission member 18, and thereby the transmission of torque from the output shaft 12a to the worm 5 is continued.

In this case, abnormal noise is generated as the side surfaces in the circumferential direction of the preliminary pieces 64 of the first preliminary engagement section 63 and the preliminary pieces 67 of the second preliminary engagement section 66 come into contact with each other, so the driver or the like is able to know that the torque transmission function by the intermediate transmission member 19 has deteriorated.

In this first example, the inner diameter side circumferential surface 39 (46) and the outer diameter side circumferential surface 40 (47) constituting the inner surface of the first annular concave section 38 (second annular concave section 45) are cylindrical surfaces that are coaxial with each other. However, in a case of carrying out the present invention, at least one of the inner diameter side circumferential surface and the outer diameter side circumferential surface constituting the inner surface of the first annular concave section (second annular concave section) may also be configured by a partial conical surface inclined in a direction in which the width dimension in the radial direction increases going toward the opening side of the first annular concave section (second annular concave section). In this case, the opening angle between the inner diameter side circumferential surface and the outer diameter side circumferential surface may be an acute angle or may be an obtuse angle. Moreover, the inner circumferential surface or outer circumferential surface of the first annular convex section (second annular convex section) that is press-fitted into the first annular concave section (second annular concave section) may also be configured by a partial conical surface inclined in the same direction and at the same angle as the inner diameter side circumferential surface or outer diameter side circumferential surface constituting the inner surface of the first annular concave section (second annular concave section) that becomes the mating surface of friction engagement.

Note that when carrying out the present invention, the shape, size, number, phase of the arrangement in the circumferential direction, and the like of the preliminary pieces provided in each of the first transmission member 17 and the second transmission member 18 are not particularly limited. In this example, each of the preliminary pieces 64 (67) has a fan shape centered around the center axis of the cylindrical section 62 (65) when viewed from the axial direction, however is not limited to that shape, and, for example, when viewed from the axial direction, the preliminary pieces may have an arbitrary shape such as a substantially rectangular shape, an elliptical shape, a circular shape, and the like. Moreover, by setting the number of preliminary pieces provided in each of the first transmission member 17 and the second transmission member 18 to one each, and by setting the center angle width of each of these preliminary pieces to be slightly less than 180 degrees, it is possible to use a configuration in which both side surfaces in the circumferential direction of the preliminary pieces are opposed to each other via a circumferential gap δ. Furthermore, when the tip-end surfaces of the preliminary pieces are viewed from the radial direction, inclined surfaces that are inclined in directions toward each other while going toward the tip-end side of the preliminary pieces are provided on both sides in the circumferential direction of the tip-end surface, and the tip-end surface may be tapered, or chamfered portions extending in the radial direction may be provided on both sides in the circumferential direction of the tip-end surface of each preliminary piece.

Second Example

Figure 19:
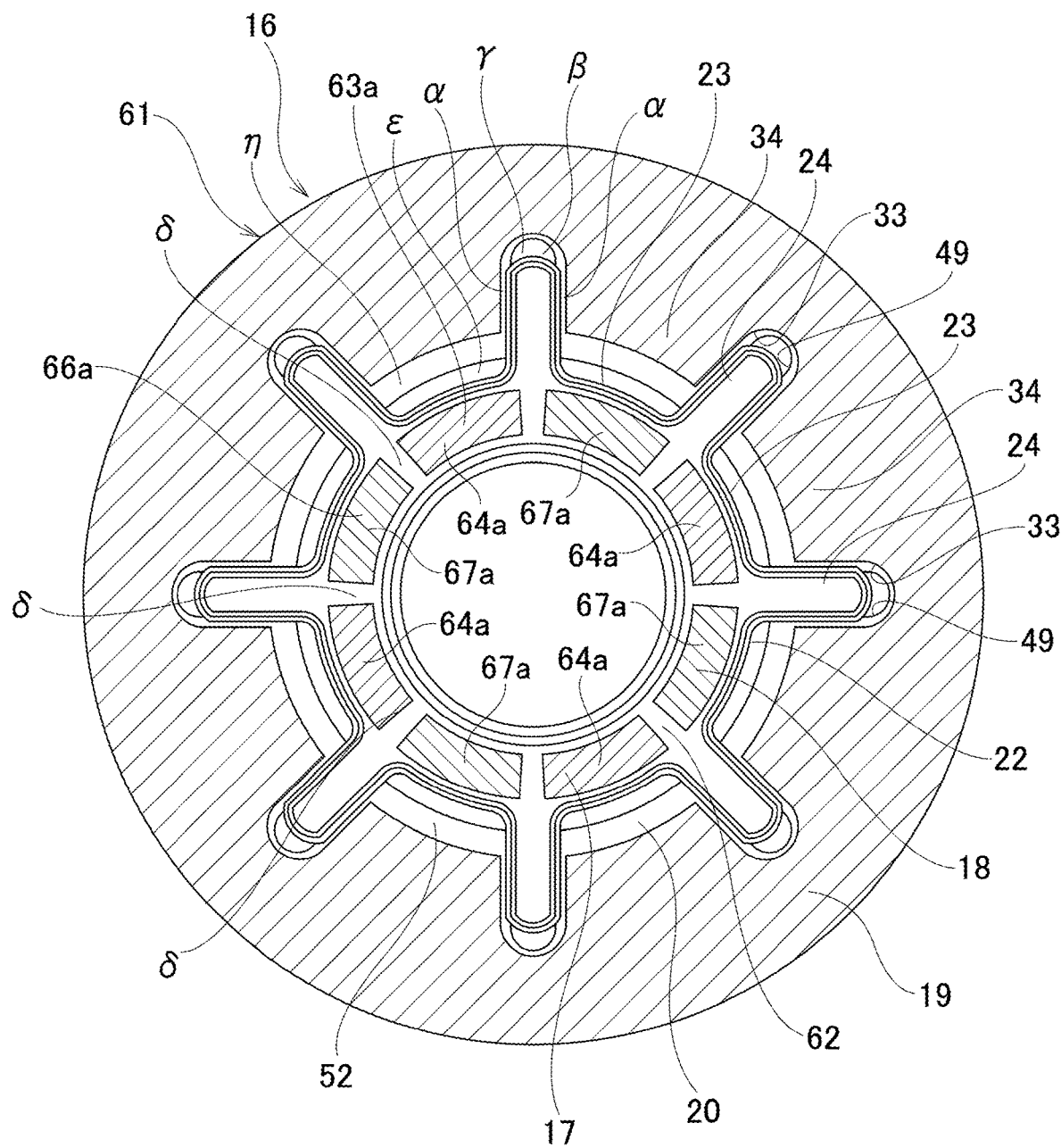
FIG. 19 is a view corresponding to FIG. 12 for a second example of an embodiment of the present invention.

A second example of an embodiment of the present invention will be described with reference to FIG. 19. In this example, the center angle width of the preliminary pieces 64a of the first preliminary engagement section 63a and the center angle width of the preliminary pieces 67a of the second preliminary engagement section 66a are larger than in the first example (more than twice as large in the illustrated example). In addition, the number of the preliminary pieces 64a, 67a is correspondingly smaller than that in the first example (half in the illustrated example). This makes it easier to mold the first transmission member 17 and the second transmission member 18. The other configurations and functions are the same as those in the first example of an embodiment.

Third Example

Figure 20:
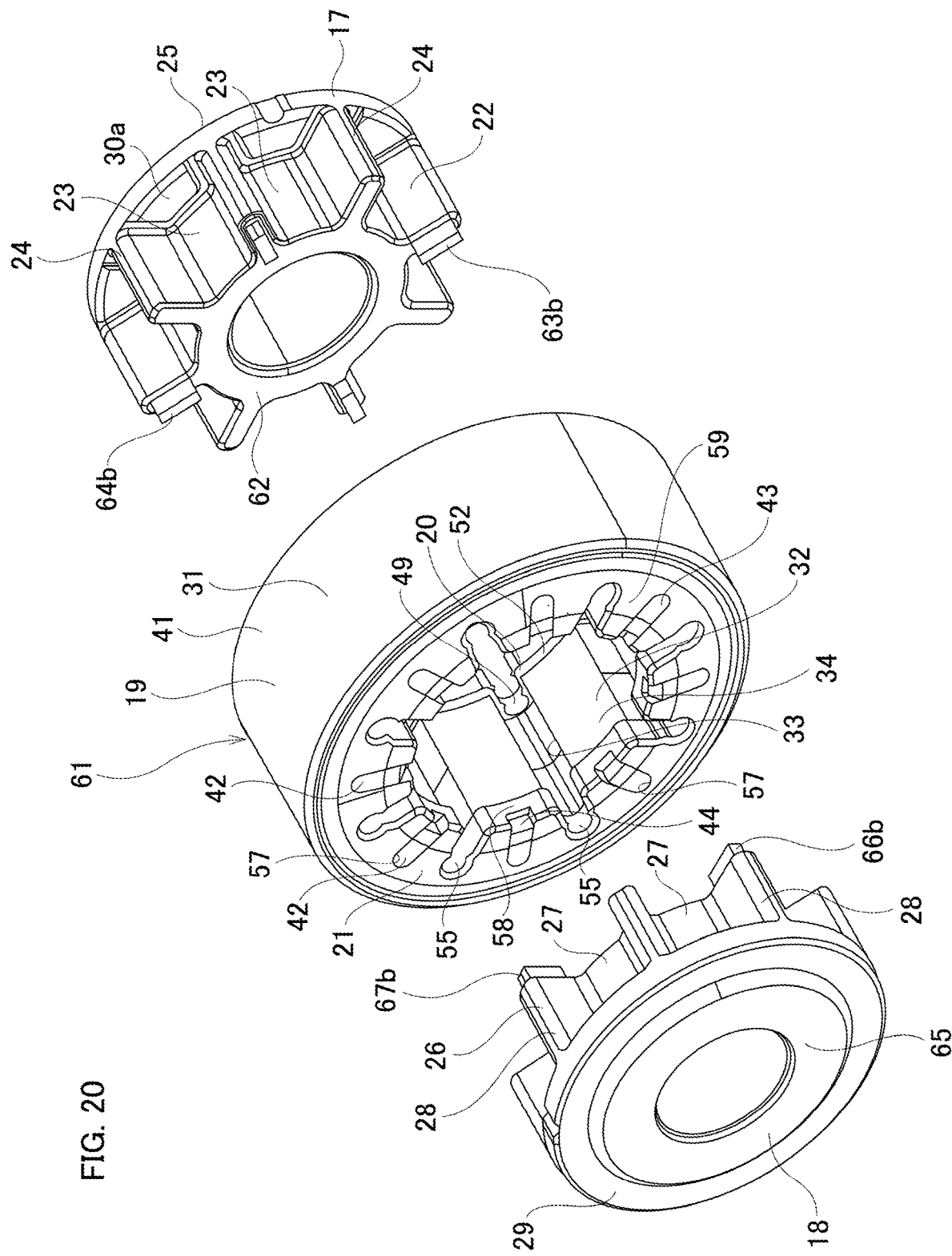
FIG. 20 is a partially exploded perspective view illustrating a torque transmission joint according to a third example of an embodiment of the present invention.
Figure 21:
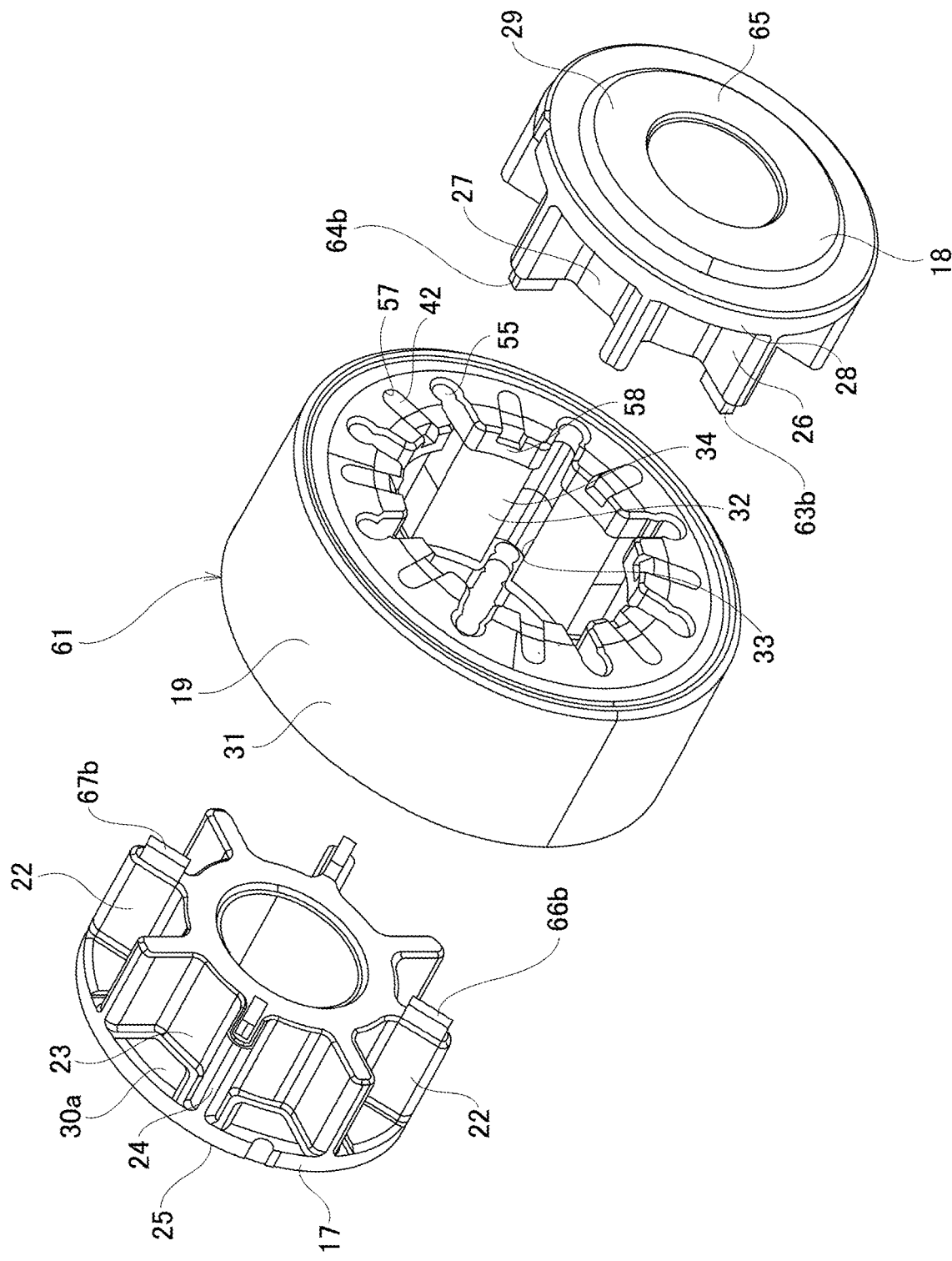
FIG. 21 is a perspective view of the torque transmission joint in FIG. 20 as seen from the opposite direction in the axial direction.

A third example of an embodiment of the present invention will be described with reference to FIG. 20 and FIG. 21. In this example, the preliminary pieces 64b of the first preliminary engagement section 63b are not provided on the inner side surface in the axial direction (the surface on the other side in the axial direction) of the cylindrical section 62 of the first transmission member 17, but are provided on the inner side surface in the axial direction of every other convex section 24 in the circumferential direction of the convex sections 24 of the first concave-convex section 22 corresponding to the end section side concave-convex section of the first transmission member 17. Moreover, the preliminary pieces 67b of the second preliminary engagement section 66b are not provided on the inner side surface in the axial direction (the surface on the one side in the axial direction) of the cylindrical section 62 of the second transmission member 18, but are provided on the inner side surface in the axial direction of every other convex section 28 in the circumferential direction of the convex sections 28 of the second concave-convex section 26 corresponding to the end section side concave-convex section of the second transmission member 18. Each of the preliminary pieces 64b and the preliminary pieces 67b has a substantially rectangular shape when viewed from the axial direction.

In the state where the first transmission member 17 and the second transmission member 18 are assembled in the intermediate transmission member 19, the phases of the arrangements in the circumferential direction of the preliminary pieces 64b of the first transmission member and the preliminary pieces 67b of the second transmission member are mutually shifted a half a pitch. Accordingly, in this state, the preliminary pieces 64b and the preliminary pieces 67b do not oppose each other or come in contact with each other in the axial direction, are alternately arranged in the circumferential direction, and engage via circumferential gaps (overlap each other in the circumferential direction). Positive circumferential gaps δ exist between the preliminary pieces 64b, 67b adjacent in the circumferential direction. The circumferential gaps δ are sufficiently larger than the circumferential gaps α existing between the side surfaces in the circumferential direction of the convex sections 24 of the first concave-convex section 22 and the convex sections 34 of the intermediate concave-convex section 32, or between the convex sections 28 of the second concave-convex section 26 and the convex sections 34 of the intermediate concave-convex section 32 (δ>>α).

In this example, in a case where the torque transmission function by the intermediate transmission member 19 is deteriorated, the side surfaces in the circumferential direction of the preliminary pieces 64b of the first preliminary engagement section 63b and the preliminary pieces 67b of the second preliminary engagement section 66b, which are adjacent to each other in the circumferential direction, sandwich the convex sections 34 of the intermediate concave-convex section 32, and there is contact between the side surfaces in the circumferential direction of the preliminary pieces 64b and the convex sections 34 of the intermediate concave-convex section 32, and between the side surfaces in the circumferential direction of the convex sections 34 of the intermediate concave-convex section 32 and the preliminary pieces 67b, and torque is transmitted from the first transmission member 17 to the second transmission member 18 by the preliminary pieces 64b and the preliminary pieces 67b engaging with each other via the convex sections 34 of the intermediate concave-convex section 32. In other words, in this example, even when the torque transmission function by the intermediate transmission member 19 is deteriorated, the torque is directly transmitted from the first transmission member 17 to the second transmission member 18, and thereby the transmission of torque from the output shaft 12a to the worm 5 is continued. The other configurations and functions are the same as those in the first example.

Fourth Example

Figure 22:
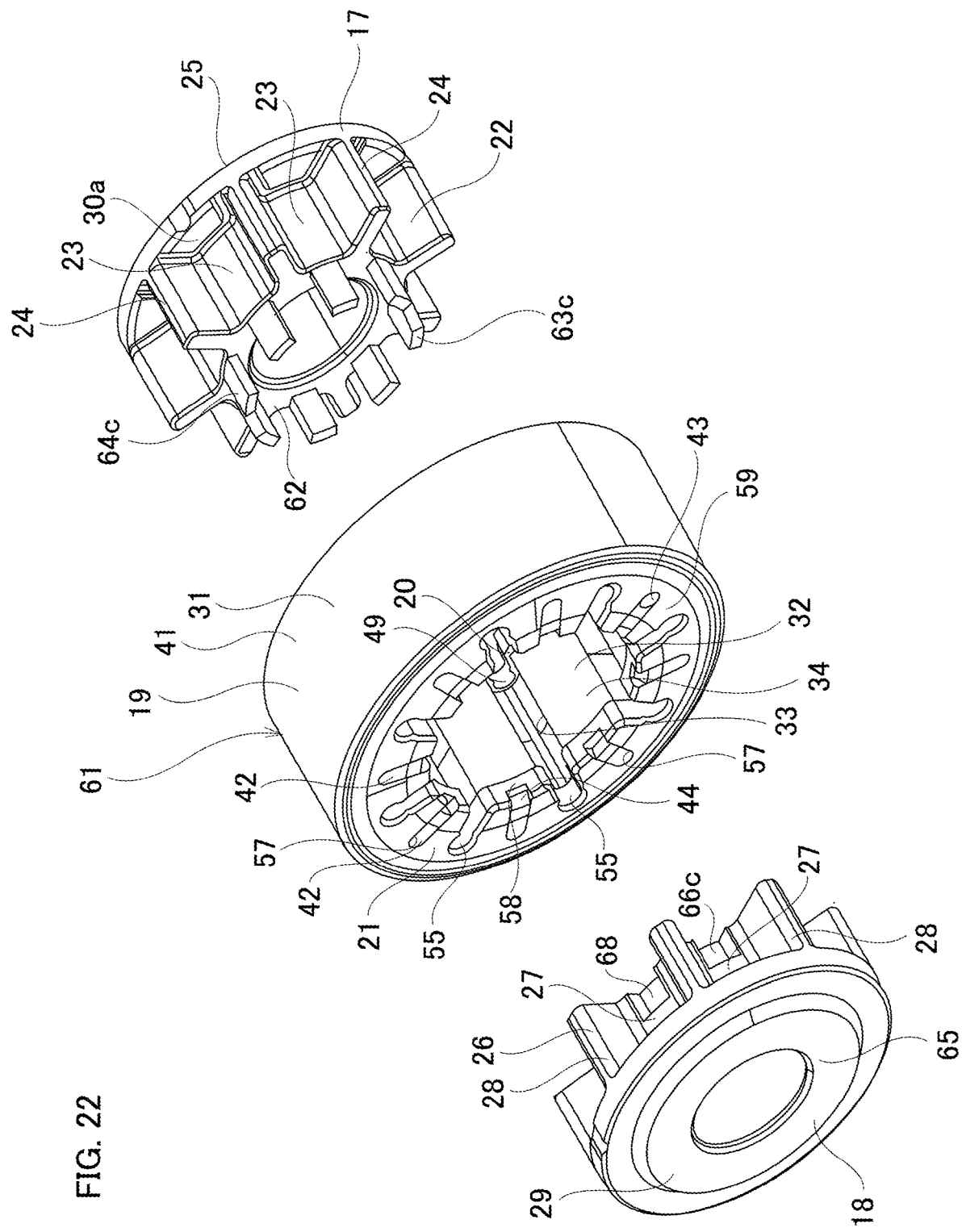
FIG. 22 is a partially exploded perspective view illustrating a torque transmission joint according to a fourth example of an embodiment of the present invention.
Figure 23:
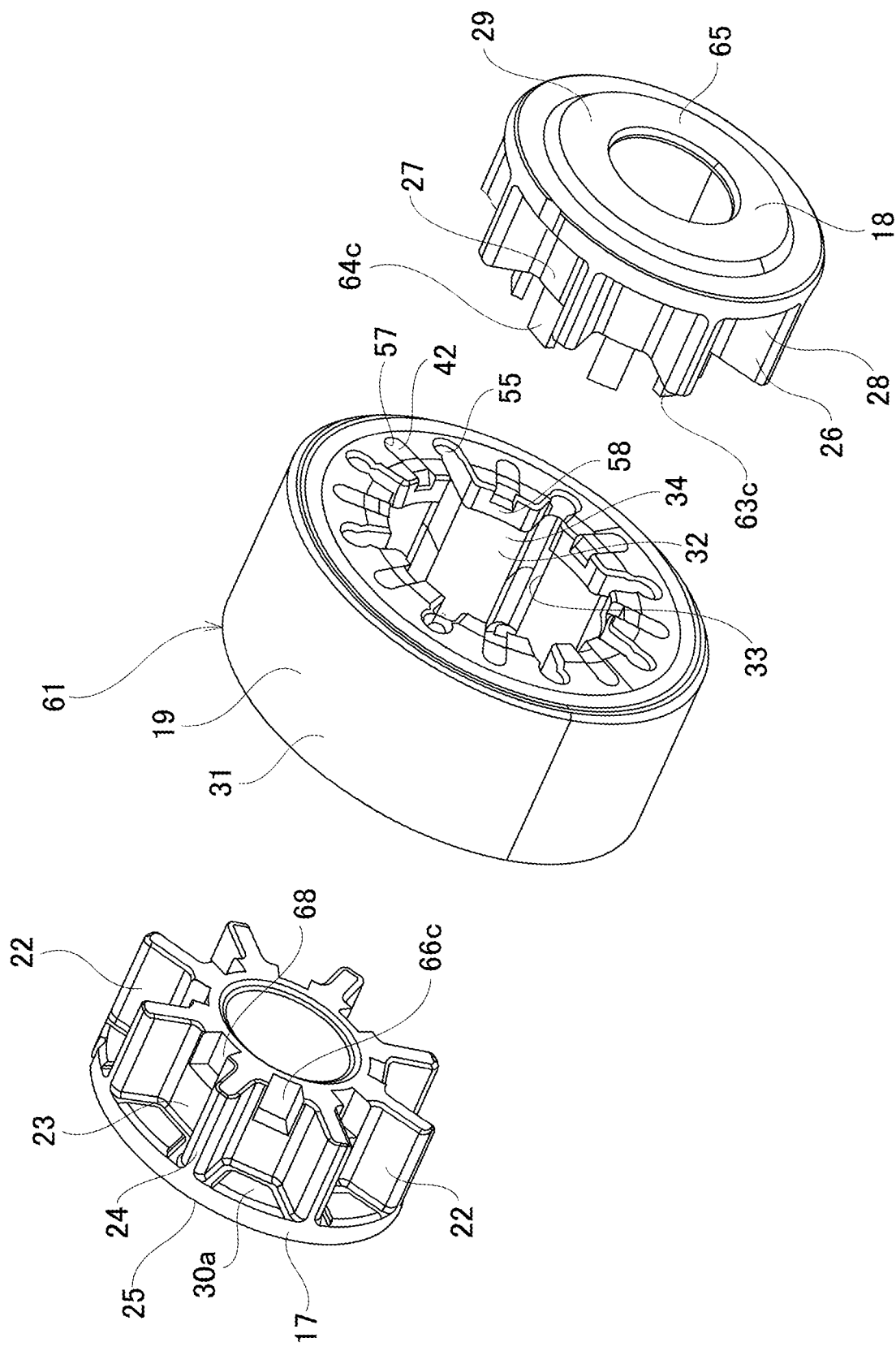
FIG. 23 is a perspective view of the torque transmission joint in FIG. 22 as seen from the opposite direction in the axial direction.

A fourth example of an embodiment of the present invention will be described with reference to FIG. 22 and FIG. 23. In this example, the first preliminary engagement section 63c of the first transmission member 17 includes a plurality of preliminary pieces 64c projecting toward the other side in the axial direction on the outer half in the radial direction of the inner side surface (the surface on the other side in the axial direction) of the cylindrical section 62, and the preliminary pieces 64c are arranged at an equal pitch in the circumferential direction. Each preliminary piece 64 has a fan shape centered around the center axis of the cylindrical section 62 when viewed from the axial direction, and a center angle width equal about half the center angle width of the concave sections 23 of the first concave-convex section 22. The number of the preliminary pieces 64c is the same as the number of the concave sections 23 of the first concave-convex section 22. Each preliminary piece 64c is arranged such that the central position in the circumferential direction of the preliminary piece 64c is aligned with the central position in the circumferential direction of the concave sections 23 of the first concave-convex section 22.

On the other hand, the second preliminary engagement section 66c of the second transmission member 18 includes preliminary concave sections 68 respectively arranged in the outer circumferential surface in the radial direction (circumferential surface on the other side in the radial direction) of the cylindrical section 62, or in other words, on the bottom surfaces of the concave sections 27 of the second concave-convex section 26 so as to be concave inward in the radial direction, and so as to open to the inner side surface in the axial direction (surface on the one end in the axial direction) of the cylindrical section 62. When viewed from the axial direction, the opening of each preliminary concave section 68 has a fan shape centered around the center axis of the cylindrical section 62, has a center angle width that is about half the center angle width of the concave sections 27 of the second concave-convex section 26, and substantially matches the shape of the tip-end surface of the preliminary piece 64c. The number of the preliminary concave sections 68 is the same as the number of the concave sections 27 of the second concave-convex section 26, and also the same as the number of the preliminary pieces 64c. The central positions in the circumferential direction of the preliminary concave sections 68 are aligned with the respective central positions in the circumferential direction of the concave sections 27 of the second concave-convex section 26.

In a state of the first transmission member 17 and the second transmission member 18 assembled in the intermediate transmission member 19, the preliminary pieces 64c of the first transmission member and preliminary concave sections 68 of the second transmission member are combined to form a plurality of preliminary engagement sections. In each preliminary engagement section, the side surfaces in the circumferential direction (outside surfaces in the circumferential direction) provided on both sides of the preliminary pieces 64c, and the side surfaces in the circumferential direction (inner side surfaces in the circumferential direction) provided on both sides in the circumferential direction of the preliminary concave sections 68 engage via a circumferential gap. More specifically, positive circumferential gaps δ exist between the side surfaces in the circumferential direction of the preliminary pieces 64c and the preliminary concave sections 68 that oppose each other. The circumferential gaps δ are larger than twice the circumferential gaps α between side surfaces in the circumferential direction of the convex sections 24 of the first concave-convex section 22 and the convex sections 34 of the intermediate concave-convex section 32, or between the side surfaces in the circumferential direction of the convex sections 28 of the second concave-convex section 26 and the convex sections 34 of the intermediate concave-convex section 32 (δ>2α).

In this example, in a case where the torque transmission function by the intermediate transmission member 19 is deteriorated, in each of the preliminary engagement sections, the side surfaces in the circumferential direction of one of the combinations of the outer side surfaces in the circumferential direction of the preliminary pieces 64c and the inner side surfaces in the circumferential direction of the preliminary concave sections 68 that face each other come in contact with each other, and thus the preliminary pieces 64c and the preliminary concave sections 68 engage with each other and torque is directly transmitted from the first transmission member 17 to the second transmission member 18. In other words, in this example, even when the torque transmission function by the intermediate transmission member 19 is deteriorated, the torque is directly transmitted from the first transmission member 17 to the second transmission member 18, and thereby the transmission of torque from the output shaft 12a to the worm 5 is continued.

Positive radial gaps are interposed between the inner circumferential surfaces in the radial direction (circumferential surfaces on the one side in the radial direction) of the preliminary pieces 64c and the bottom surfaces of the preliminary concave sections 68. The positive radial gaps between the inner circumferential surfaces in the radial direction of the preliminary pieces 64c and the bottom surfaces of the preliminary concave sections 68 are larger than the positive radial gaps β (see FIG. 11) that are formed between the surfaces on the outer ends in the radial direction of the convex sections 24 of the first concave-convex section 22 and the bottom surfaces of the first elastic slits 49, and the positive radial gaps γ (refer to FIG. 11) that are formed between the surfaces on the outer ends in the radial direction of the convex sections 24 of the first concave-convex section 22 and the bottom surfaces of the concave sections 33 of the intermediate concave-convex section 32. Consequently, large eccentricity, inclination, or the like may arise between the first transmission member 17 and the second transmission member 18, and even in a case of relative movement between the first transmission member 17 or the second transmission member 18 and the intermediate transmission member 19, the inner circumferential surface in the radial direction of the preliminary piece 64c and the bottom surface of the preliminary concave portion 68 do not contact each other, due to the presence of the first elastic member 20 or the second elastic member 21. Note that positive axial gaps are desirable between the surfaces on the tip-end in the axial direction (surfaces on the other side in the axial direction) of the preliminary pieces 64c and the back surfaces (surface on the one side in the axial direction) of the preliminary concave sections 68, however a zero gap may also be interposed.

In this example, the shape, size, number, phase of the arrangement in the circumferential direction, and the like of the preliminary pieces provided in the first transmission member 17 and the preliminary concave sections provided in the second transmission member 18 are not particularly limited. The other configurations and functions are the same as those in the first example.

Fifth Example

Figure 24:
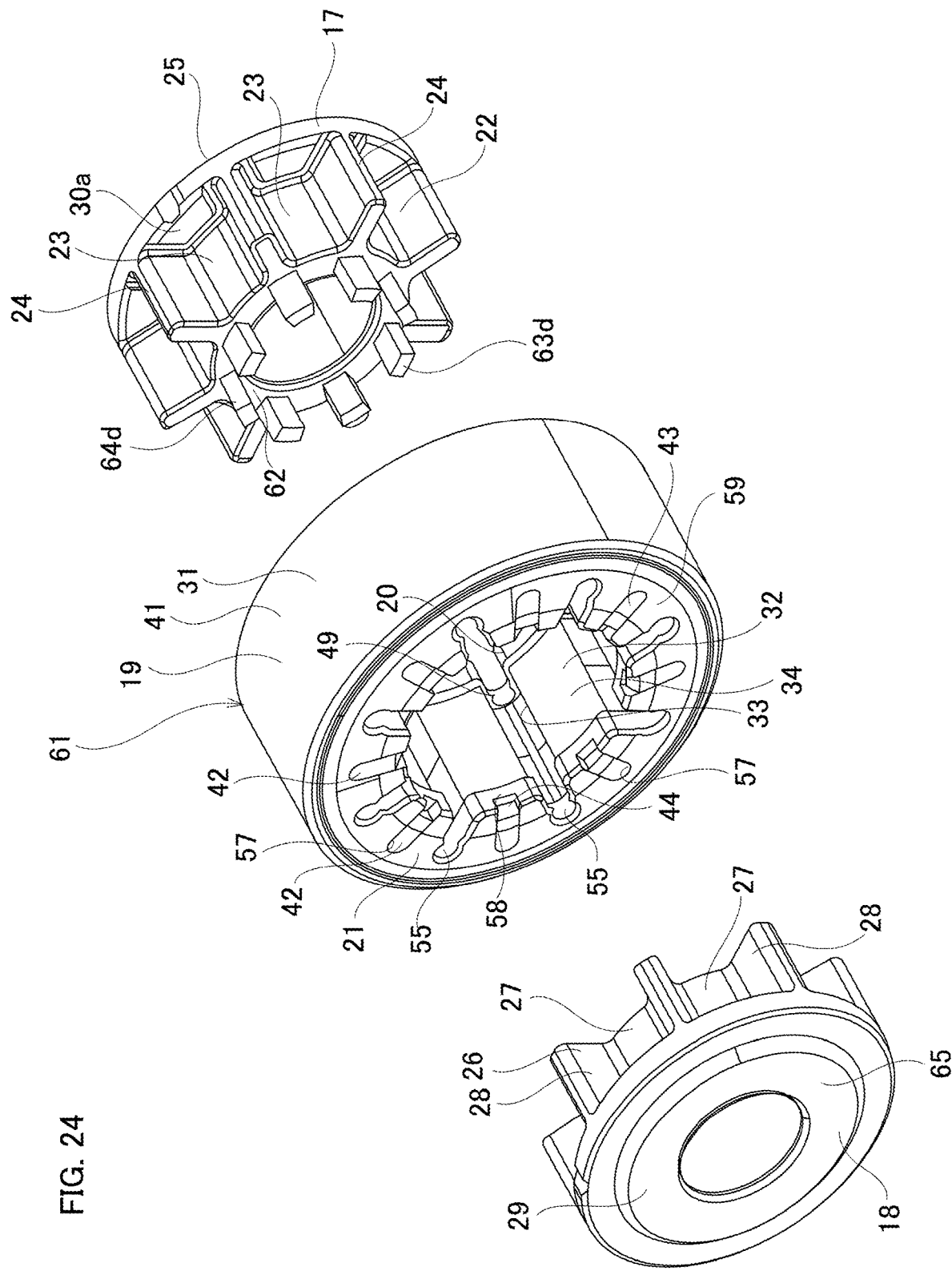
FIG. 24 is a partially exploded perspective view illustrating a torque transmission joint according to a fifth example of an embodiment of the present invention.
Figure 25:
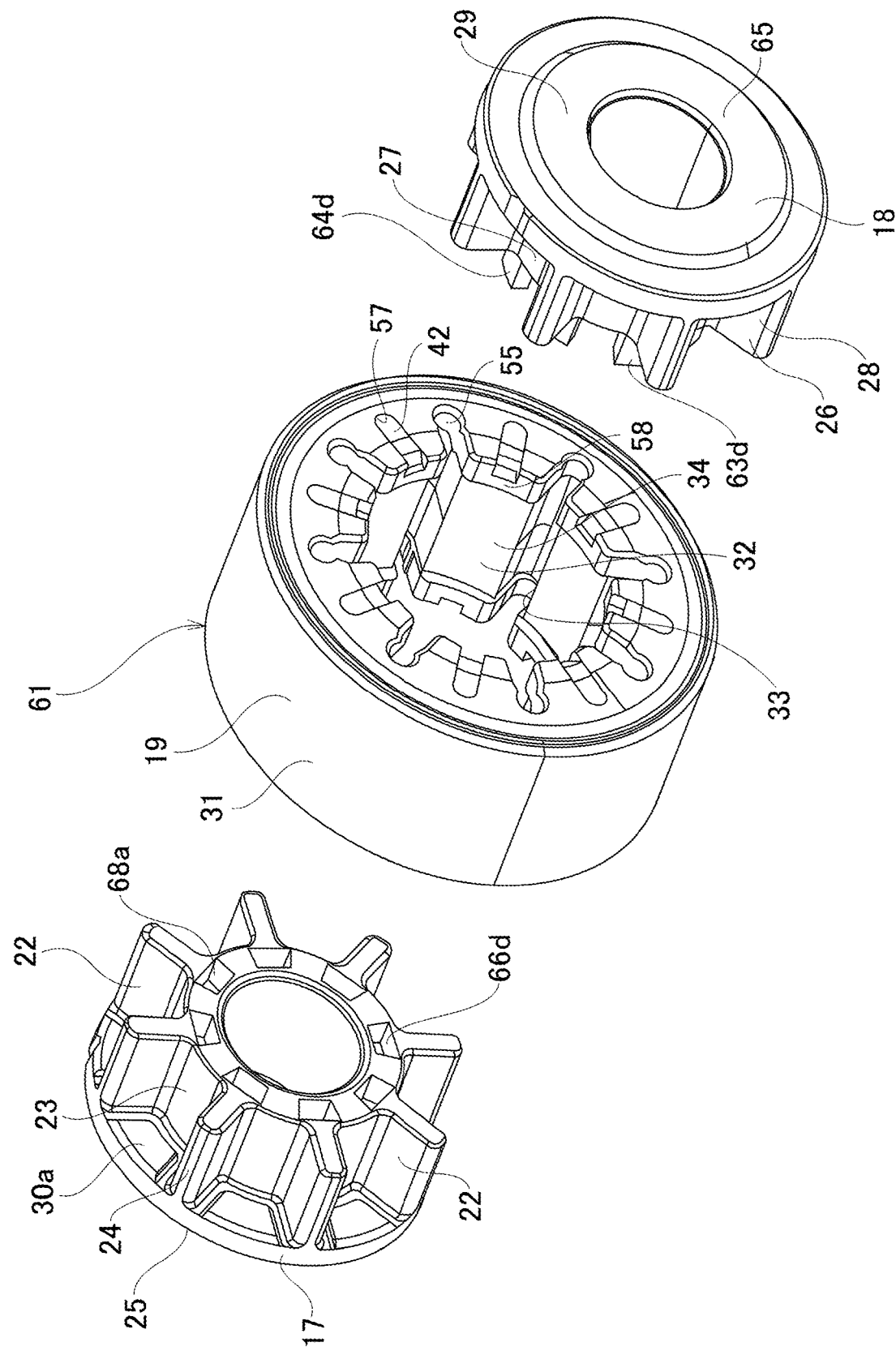
FIG. 25 is a perspective view of the torque transmission joint in FIG. 24 as seen from the opposite direction in the axial direction.

A fifth example of an embodiment of the present invention will be described with reference to FIG. 24 and FIG. 25. In this example, the first preliminary engagement section 63d of the first transmission member 17 includes a plurality of preliminary pieces 64d projecting toward the other side in the axial direction on the outer half in the radial direction of the inner side surface (the surface on the other side in the axial direction) of the cylindrical section 62, and the preliminary pieces 64c are arranged at an equal pitch in the circumferential direction. Each preliminary piece 64d has a fan shape centered around the center axis of the cylindrical section 62 when viewed from the axial direction, and a center angle width equal to about half the center angle width of the concave sections 23 of the first concave-convex section 22. The number of preliminary pieces 64d is the same as the number of protrusions 24 of the first concave-convex section 22. The preliminary pieces 64d are arranged such that the central positions in the circumferential direction of the preliminary pieces 64d are aligned with central positions in the circumferential direction of the convex sections 24 of the first concave-convex section 22.

On the other hand, the second preliminary engagement section 66d of the second transmission member 18 has a plurality of preliminary concave sections 68a arranged on the inner side surface in the axial direction (surface on the one side in the axial direction) of the cylindrical section 62 so as to be concave inward in the axial direction (toward the other side in the axial direction), and the preliminary concave sections 68a are arranged at equal pitch in the circumferential direction. When viewed from the axial direction, the opening of each preliminary concave section 68a has a fan shape centered around the center axis of the cylindrical section 62, has a center angle width that is about half the center angle width of the concave sections 27 of the second concave-convex section 26, and has a shape that substantially matches the shape of the tip-end surface of the preliminary pieces 64d. The number of preliminary concave sections 68a is also the same as the number of the convex sections 28 of the second concave-convex section 26, and is also the same as the number of preliminary pieces 64d. The central positions in the circumferential direction of the preliminary concave sections 68a are aligned with the central positions in the circumferential direction of the convex sections 28 of the second concave-convex section 26.

In a state in which the first transmission member 17 and the second transmission member 18 are assembled in the intermediate transmission member 19, the preliminary pieces 64d of the first transmission member and preliminary concave sections 68a of the second transmission member are combined to form a plurality of preliminary engagement sections. In each preliminary engagement section, the both side surfaces in the circumferential direction (outer side surfaces in the circumferential direction) provided on both sides in the circumferential direction of the preliminary pieces 64d, and the side surfaces in the circumferential direction (inner side surfaces in the circumferential direction) provided on both sides in the circumferential direction of the preliminary concave sections 68a engage via circumferential gaps. More specifically, positive circumferential gaps δ exist between the side surfaces in the circumferential direction of the preliminary pieces 64d and the preliminary concave sections 68a that oppose each other. The circumferential gaps δ are larger than twice the circumferential gaps α between side surfaces in the circumferential direction of the convex sections 24 of the first concave-convex section 22 and the convex sections 34 of the intermediate concave-convex section 32, or between the side surfaces in the circumferential direction of the convex sections 28 of the second concave-convex section 26 and the convex sections 34 of the intermediate concave-convex section 32 (δ>2α).

In this example, in a case where the torque transmission function by the intermediate transmission member 19 is deteriorated, in each of the preliminary engagement sections, the side surfaces in the circumferential direction of one of the combinations of the outer side surfaces in the circumferential direction of the preliminary pieces 64d and the inner side surfaces in the circumferential direction of the preliminary concave sections 68 that face each other come in contact with each other, and thus the preliminary pieces 64*d* and the preliminary concave sections 68*a* engage with each other and torque is directly transmitted from the first transmission member 17 to the second transmission member 18. In other words, in this example, even when the torque transmission function by the intermediate transmission member 19 is deteriorated, the torque is directly transmitted from the first transmission member 17 to the second transmission member 18, and thereby the transmission of torque from the output shaft 12*a* to the worm 5 is continued.

Positive radial gaps are interposed between the inner circumferential surfaces in the radial direction (circumferential surfaces on the one side in the radial direction) of the preliminary pieces 64*d* and the bottom surfaces of the preliminary concave sections 68*a*. In addition, positive radial gaps are interposed between the outer circumferential surface in the radial direction (circumferential surface on the other side in the radial direction) of the preliminary pieces 64*d* and the top surfaces of the preliminary concave sections 68*a*. The positive radial gaps between inner circumferential surfaces in the radial direction of the preliminary pieces 64*d* and the bottom surfaces of the preliminary concave sections 68*a*, and the positive gaps between the outer circumferential surfaces in the radial direction of the preliminary pieces 64*d* and the top surface of the preliminary concave sections 68*a* are larger than the positive radial gaps β (refer to FIG. 11) between the surfaces on the outer ends in the radial direction of the convex sections 24 of the first concave-convex section 22 and the bottom surfaces of the first elastic slits 49, and the positive radial gaps γ (refer to FIG. 11) between the surfaces on the outer ends in the radial direction of the convex sections 24 of the first concave-convex section 22 and the bottom surfaces of the concave sections 33 of the intermediate concave-convex section 32. Consequently, large eccentricity, inclination, or the like occurs between the first transmission member 17 and the second transmission member 18, and even in the case of relative movement in the radial direction between the first transmission member 17 or the second transmission member 18 and the intermediate transmission member 19, due to the presence of the first elastic member 20 or the second elastic member 21, there is no contact between the inner circumferential surfaces in the radial direction of the preliminary pieces 64*c* and the bottom surfaces of the preliminary concave sections 68, or between the outer circumferential surfaces in the radial direction of the preliminary pieces 64*d* and the top surfaces of the preliminary concave sections 68*a*. Note that positive axial gaps are desirable between the surfaces on the tip-ends in the axial direction (surfaces on the other side in the axial direction) of the preliminary pieces 64*d* and the back surfaces (surfaces on the one side in the axial direction) of the preliminary concave sections 68*a*, however zero gaps may also be interposed.

In this example, the shape, size, number, phase of the arrangement in the circumferential direction, and the like of the preliminary pieces provided in the first transmission member 17 and the preliminary concave sections provided in the second transmission member 18 are not particularly limited. The other configurations and functions are the same as those in the first example.

Sixth Example

Figure 26:
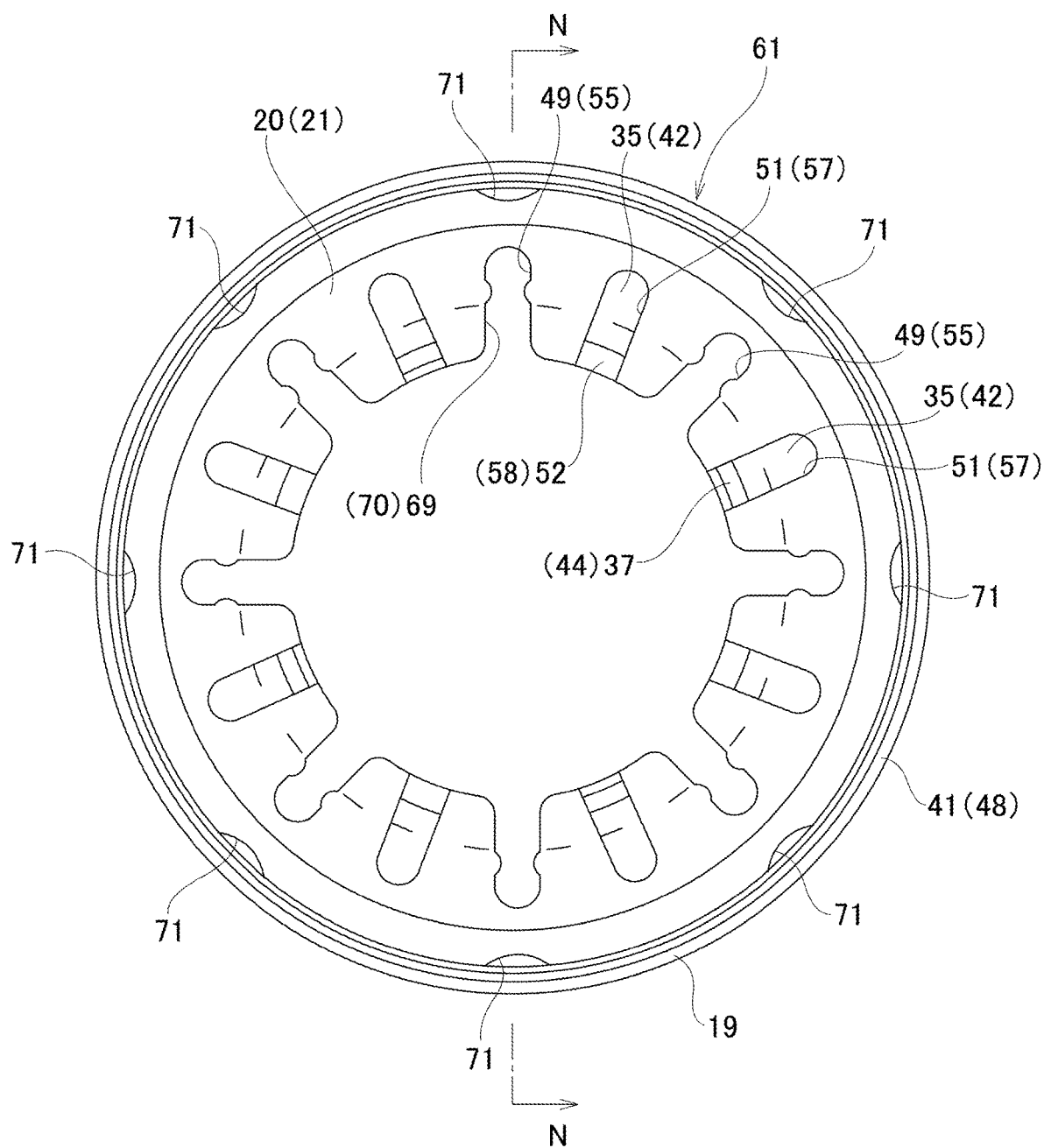
FIG. 26 is a view as seen from the side of an intermediate transmission member, a first elastic member, and a second elastic member taken out from a torque transmission joint according to a sixth example of an embodiment of the present invention.
Figure 27:
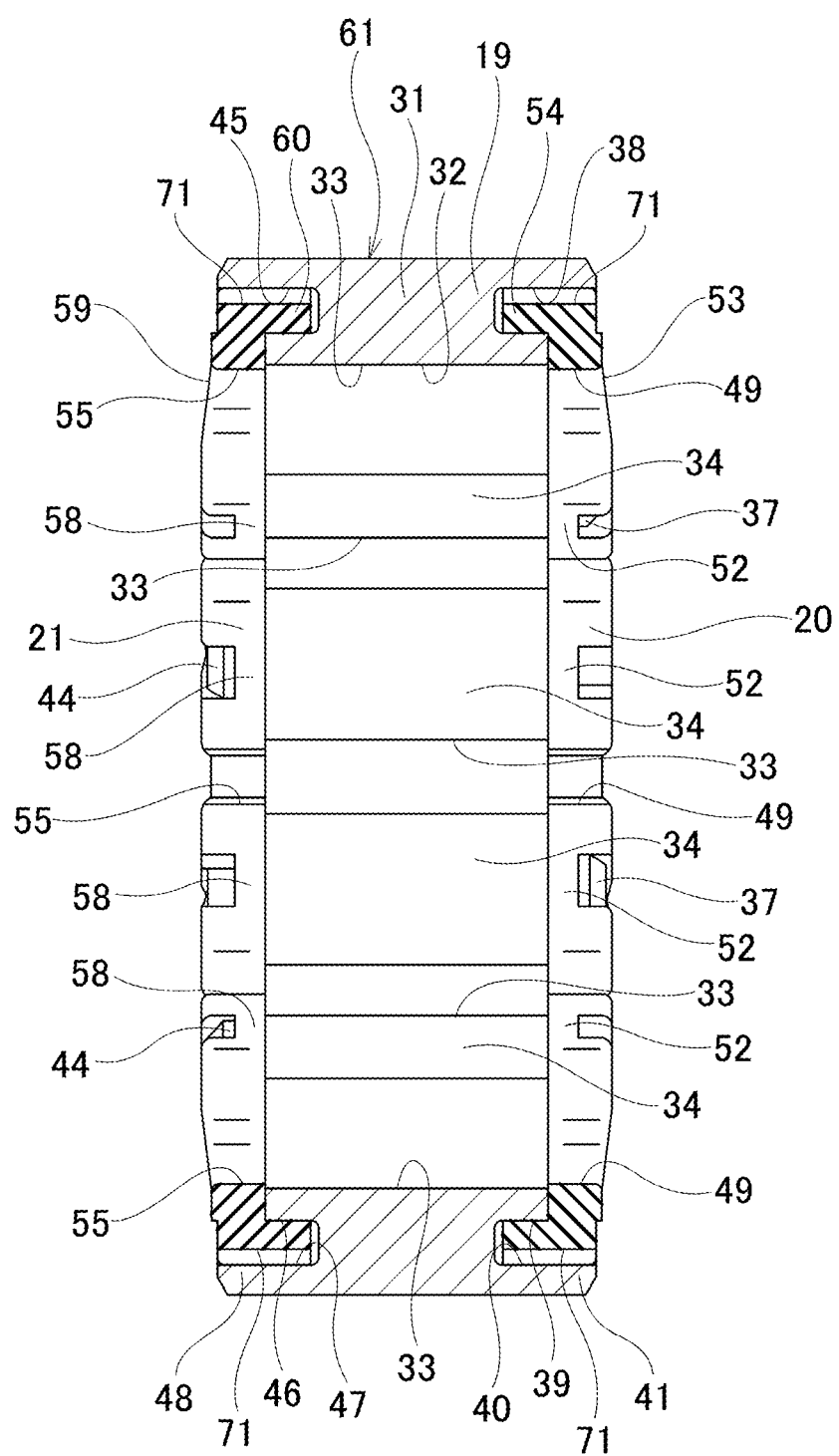
FIG. 27 is a cross-sectional view of section N-N in FIG. 26.
Figure 28:
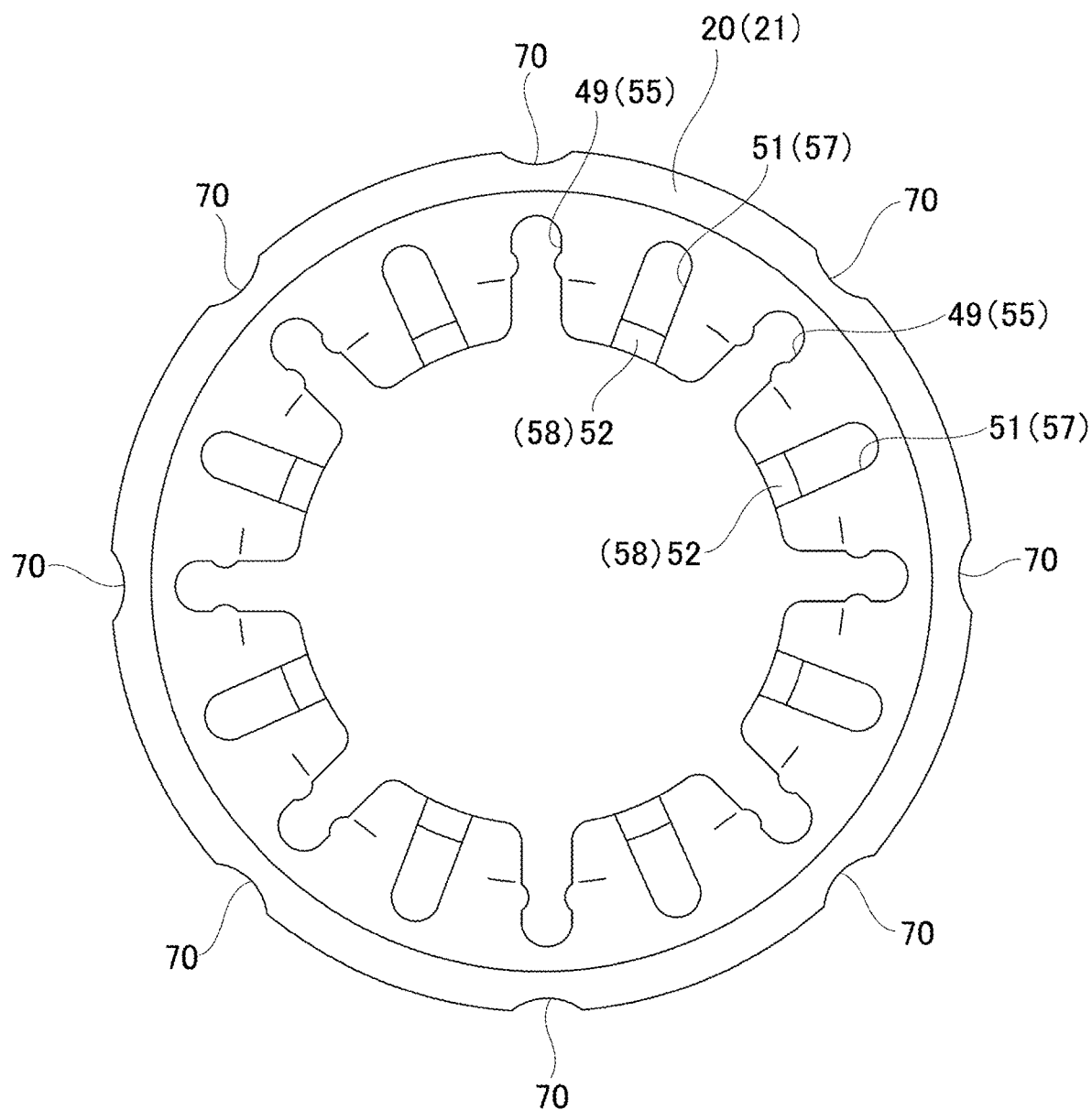
FIG. 28 is a view as seen from the side of the first elastic member or the second elastic member taken out from the torque transmission joint according to the sixth example.

A sixth example of an embodiment of the present invention will be described with reference to FIGS. 26 to 28. In this example, the first elastic member 20 includes a plurality of communicating concave sections 71 each formed over the entire length in the axial direction, at a plurality of locations (eight locations in the example in the figures) in the circumferential direction of the outer circumferential surface thereof, including the outer circumferential surface of the first annular convex section 54, and equally spaced in the circumferential direction of the outer peripheral surface. The second elastic member 21 includes a plurality of communicating concave sections 71 each formed over the entire length in the axial direction on the outer circumferential surface thereof, including the outer circumferential surface of the second annular convex section 60, and provided at a plurality of locations (eight locations in the example in the figures) at equal intervals in the circumferential direction thereof.

Therefore, in a state where the first elastic member 20 is assembled in the intermediate transmission member 19, a gap exists between the outer diameter side circumferential surface 40 of the first annular concave section 38 of the intermediate transmission member 19 and the inner circumferential surface of the first cylindrical section 41, and the inner surface of the communicating concave sections 71, and the gap communicates with the inner end section in the axial direction of the first annular concave section 38 and space on the outside in the axial direction. In addition, in a state where the second elastic member 21 is assembled in the intermediate transmission member 19, a gap exists between the outer diameter side circumferential surface 47 of the second annular concave section 45 of the intermediate transmission member 19 and the inner circumferential surface of the second cylindrical section 48, and the inner surface of the communicating concave sections 71, and the gap communicates with the inner end section in the axial direction of the second annular concave section 45 and space on the outside in the axial direction.

In this example, when the first annular convex section 54 (second annular convex section 60) is press-fitted inside the first annular concave section 38 (second annular concave section 45), the air inside the first annular concave section 38 (second annular concave section 45) is discharged to the outside through the gap. Therefore, the air pressure inside the first annular concave section 38 (second annular concave section 45) increases, and the occurrence of problems such as the first annular convex section 54 (second annular convex section 60) being pushed back to the outside in the axial direction of first annular recess 38 (second annular recess 45) and the like are prevented.

When carrying out the present invention, the width in the circumferential direction, the number, and the phase of the arrangement in the circumferential direction of the communicating concave sections 71 are not particularly limited. For example, the number of communicating concave sections may be one. Various shapes may be adopted as the shape of the inner surface of the communicating concave sections. Moreover, when carrying out the present invention, the communicating concave sections for communicating between the section on the inner end in the axial direction of the first annular concave section 38 (second annular concave section 45) and the space outside in the axial direction may be provided on the outer diameter side circumferential surface 40 (47) and the inner circumferential surface of the first cylindrical section 41 (second cylindrical section 48) constituting the inner surface of the first annular concave section 38 (second annular concave section 45). The other configurations and functions are the same as those in the first example.

The present invention may be carried out by appropriately combining the configurations of the above-described embodiments as long as no contradiction arises.

Moreover, in embodiments described above, in regard to the torque transmission joint 16, the one side in the radial direction side is the inside in the radial direction, and the other side in the radial direction is the outside in the radial direction. However, when carrying out the present invention, in regard to the torque transmission joint, a configuration may be adopted in which the one side in the radial direction is the outside in the radial direction, and the other side in the radial direction is the inside in the radial direction, or in other words, configuration may be adopted in which the inside and the outside in the radial direction are reversed from that in the configuration of the embodiments described above; in other words, configuration may be adopted in which the intermediate transmission member has an intermediate concave-convex section on the outer circumferential surface, which is the circumferential surface on the one side in the radial direction, and each of the pair of end section transmission members has end section side concave-convex sections on the inner circumferential surface, which is the circumferential surface on the other side in the radial direction.

When carrying out the present invention, it is also possible to configure only one of the sections on both sides in the axial direction of the joined body of the intermediate transmission member and the pair of elastic members so as to have the configuration of the embodiments described above, or it is also possible to use a configuration in which the configurations of the embodiments described above are appropriately combined.

The present invention may also be applied to a torque transmission joint that does not include a pair of elastic members, such as the torque transmission joint described in JP 2002-518643A. In other words, by providing only the intermediate transmission member and the pair of end section transmission members of the members constituting the torque transmission joint of the present invention, even in a case of the torque transmission function by the intermediate transmission member is deteriorated, the function of the present of invention of enabling the continuation of torque transmission between the pair of end section transmission members is achieved.

REFERENCE SIGNS LIST

1 Steering wheel
2 Steering shaft
3 Housing
4 Worm wheel
5 Worm
6, 6*a* Worm shaft
7 Worm teeth
8 Electric motor
9*a*, 9*b* Rolling bearing
10 Pressing piece
11 Coil spring
12, 12*a* Output shaft
13 Spline hole
14 Spline shaft section
15 Force mechanism
16 Torque transmission joint
17 First transmission member
18 Second transmission member
19 Intermediate transmission member
20 First elastic member
21 Second elastic member
22 First concave-convex section
23 Concave section
24 Convex section
25 First flange section
26 Second concave-convex section
27 Concave section
28 Convex section
29 Second flange section
30*a*, 30*b* Positioning side surface
31 Main body section
32 Intermediate concave-convex section
33 Concave section
34 Convex section
35 First tooth section
36 Inclined side surface section
37 First engaging protrusion
38 First annular concave section
39 Inner diameter side circumferential surface
40 Outer diameter side circumferential surface
41 First cylindrical section
42 Second tooth section
43 Inclined side surface section
44 Second engaging protrusion
45 Second annular concave section
46 Inner diameter side circumferential surface
47 Outer diameter side circumferential surface
48 Second cylindrical section
49 First elastic slit
50 Elastic protrusion
51 First through hole
52 First engaging beam
53 Inclined side surface section
54 First annular convex section
55 Second elastic slit
56 Elastic protrusion
57 Second through hole
58 Second engaging beam
59 Inclined side surface section
60 Second annular convex section
61 Joined body
62 Cylindrical section
63, 63*a*, 63*b*, 63*c* First preliminary engagement section
64, 64*a*, 64*b*, 64*c* Preliminary piece
65 Cylindrical section
66, 66*a*, 66*b*, 66*c* Second preliminary engagement section
67, 67*a*, 67*b* Preliminary piece
68 Preliminary concave section
69 Flat section
70 Flat section
71 Communicating concave section

The invention claimed is:

1. A torque transmission joint comprising:
an intermediate transmission member; and
a pair of end section transmission members;
wherein:
the intermediate transmission member has an intermediate concave-convex section in which concave sections and convex sections are alternately arranged on a circumferential surface on one side in a radial direction;
the pair of end section transmission members is arranged in an axial direction of the intermediate transmission member, and each of the pair of end section transmission members includes an end section side concave-convex section in which concave sections and convex sections are alternately arranged on a circumferential surface on an other side in the radial direction, and a preliminary engagement section provided at an end section in the axial direction of a side where the pair of end section transmission members are close to each other;

the convex sections of the end section side concave-convex sections engage with the concave sections of the intermediate concave-convex section;

the preliminary engagement sections of the pair of end section transmission members engage with each other in a state with circumferential gaps interposed therebetween;

a pair of elastic members is assembled in sections on both sides in the axial direction of the intermediate transmission member;

the convex sections of the end section side concave-convex sections of the pair of end section transmission members engage with the pair of elastic members, and engage with the concave sections of the intermediate concave-convex section with circumferential gaps interposed therebetween; and the circumferential gaps between the preliminary engagement sections of the pair of end section transmission members are configured to be larger than the circumferential gaps between the concave sections of the intermediate concave-convex section and the convex sections of the end section side concave-convex sections of the pair of end section transmission members.

2. The torque transmission joint according to claim 1, wherein:

each of the preliminary engagement sections of the pair of end section transmission members is configured by a plurality of preliminary pieces arranged at an equal pitch in the circumferential direction; and the preliminary pieces of one end section transmission member of the pair of end section transmission members and the preliminary pieces of the other end section transmission member of the pair of end section transmission members are alternately arranged one by one in the circumferential direction.

3. The torque transmission joint according to claim 2, wherein between the pair of end section transmission members, the plurality of preliminary pieces and the end section side concave-convex sections are configured to have the same shape and the same size;

the number of the plurality of preliminary pieces is the same as the number of the concave sections of the end section side concave-convex sections; and each of the plurality of preliminary pieces is arranged inside a range in the circumferential direction interposed between the respective central positions in the circumferential direction of the concave sections and the convex sections that are adjacent to each other in the circumferential direction of the concave sections and convex sections of the end section side concave-convex sections.

4. The torque transmission joint according to claim 3, wherein each of the plurality of preliminary pieces is arranged inside a range in the circumferential direction interposed between a central position in the circumferential direction of one convex section of the convex sections of the end section side concave-convex sections, and a central position in the circumferential direction of another convex section adjacent to the one convex section of the convex sections of the end section side concave-convex sections.

5. An electric power steering device comprising:
a housing;
a worm wheel rotatably supported by the housing;
a worm having a worm shaft, and worm teeth provided on an outer circumferential surface of the worm shaft and engaging with the worm wheel, the worm rotatably supported with respect to the housing;
an electric motor comprising an output shaft for rotationally driving the worm; and
a torque transmission joint for connecting the output shaft of the electric motor and the worm shaft to enable torque transmission; wherein
the torque transmission joint is constructed by the torque transmission joint according to claim 1; one end section transmission member of the pair of end section transmission members is fixed to or integrally formed with a tip-end section of the output shaft of the electric motor; and the other end section transmission member of the pair of end section transmission members is fixed to or integrally formed with a base end section of the worm shaft.

6. A torque transmission joint comprising:
an intermediate transmission member; and
a pair of end section transmission members;
wherein:
the intermediate transmission member has an intermediate concave-convex section in which concave sections and convex sections are alternately arranged on a circumferential surface on one side in a radial direction;
the pair of end section transmission members is arranged in an axial direction on the one side in the radial direction of the intermediate transmission member, and each of the pair of end section transmission members includes an end section side concave-convex section in which concave sections and convex sections are alternately arranged on a circumferential surface on an other side in the radial direction, and a preliminary engagement section provided at an end section in the axial direction of a side where the pair of end section transmission members are close to each other;
in a state where the end section side concave-convex sections of the pair of end section transmission members are separated from each other in the axial direction, the convex sections of the end section side concave-convex sections engage with the concave sections of the intermediate concave-convex section; and
the preliminary engagement sections of the pair of end section transmission members engage with each other in a state with circumferential gaps interposed therebetween.

7. The torque transmission joint according to claim 6, wherein:

a pair of elastic members is assembled in sections on both sides in the axial direction of the intermediate transmission member;

the convex sections of the end section side concave-convex sections of the pair of end section transmission members engage with the pair of elastic members, and engage with the concave sections of the intermediate concave-convex section with circumferential gaps interposed therebetween; and the circumferential gaps between the preliminary engagement sections of the pair of end section transmission members are configured to be larger than the circumferential gaps between the concave sections of the intermediate concave-convex section and the convex sections of the end section side concave-convex sections of the pair of end section transmission members.

8. The torque transmission joint according to claim 6, wherein:
- each of the preliminary engagement sections of the pair of end section transmission members is configured by a plurality of preliminary pieces arranged at an equal pitch in the circumferential direction; and
- the preliminary pieces of one end section transmission member of the pair of end section transmission members and the preliminary pieces of the other end section transmission member of the pair of end section transmission members are alternately arranged one by one in the circumferential direction.

9. The torque transmission joint according to claim 8, wherein:
- between the pair of end section transmission members, the plurality of preliminary pieces and the end section side concave-convex sections are configured to have the same shape and the same size;
- the number of the plurality of preliminary pieces is the same as the number of the concave sections of the end section side concave-convex sections; and
- each of the plurality of preliminary pieces is arranged inside a range in the circumferential direction interposed between the respective central positions in the circumferential direction of the concave sections and the convex sections that are adjacent to each other in the circumferential direction of the concave sections and convex sections of the end section side concave-convex sections.

10. The torque transmission joint according to claim 9, wherein:
- each of the plurality of preliminary pieces is arranged inside a range in the circumferential direction interposed between a central position in the circumferential direction of one convex section of the convex sections of the end section side concave-convex sections, and a central position in the circumferential direction of another convex section adjacent to the one convex section of the convex sections of the end section side concave-convex sections.

11. An electric power steering device comprising:
- a housing;
- a worm wheel rotatably supported by the housing;
- a worm having a worm shaft, and worm teeth provided on an outer circumferential surface of the worm shaft and engaging with the worm wheel, the worm rotatably supported with respect to the housing;
- an electric motor comprising an output shaft for rotationally driving the worm; and
- a torque transmission joint for connecting the output shaft of the electric motor and the worm shaft to enable torque transmission;

wherein:
- the torque transmission joint is constructed by the torque transmission joint according to claim 6;
- one end section transmission member of the pair of end section transmission members is fixed to or integrally formed with a tip-end section of the output shaft of the electric motor; and
- the other end section transmission member of the pair of end section transmission members is fixed to or integrally formed with a base end section of the worm shaft.

* * * * *